United States Patent [19]
Anderson

[11] 3,811,179
[45] May 21, 1974

[54] TOOL CHANGER
[75] Inventor: William T. Anderson, Arlington Heights, Ill.
[73] Assignee: Do All Company, Des Plaines, Ill.
[22] Filed: July 16, 1971
[21] Appl. No.: 163,268

[30] Foreign Application Priority Data
Aug. 14, 1970 Great Britain.................... 39348/70

[52] U.S. Cl................................ 29/568, 214/1 BD
[51] Int. Cl............................................ B23q 3/157
[58] Field of Search........... 29/568; 214/1 BD, 1 BB

[56] References Cited
UNITED STATES PATENTS

| | | | |
|---|---|---|---|
| 3,431,635 | 3/1969 | Balding | 29/568 |
| 3,613,224 | 10/1971 | Newton et al. | 29/568 |
| 3,646,664 | 3/1972 | Vearil et al. | 29/568 |
| 3,327,386 | 6/1967 | Jerve | 29/568 |
| 3,524,248 | 8/1970 | Durr et al. | 29/568 |
| 3,619,898 | 11/1971 | Perry et al. | 29/568 |
| 3,339,273 | 9/1967 | Knosp | 29/568 |
| 3,678,572 | 7/1972 | Mello et al. | 29/568 |
| 3,316,629 | 5/1967 | Meyer | 29/568 |
| 3,520,050 | 7/1970 | Trebble | 29/568 |
| 3,590,470 | 7/1971 | Brainard | 29/568 |
| 3,412,459 | 11/1968 | Hollis | 29/568 |
| 3,647,090 | 3/1972 | Suzuki et al. | 29/568 X |

Primary Examiner—Andrew R. Juhasz
Assistant Examiner—Z. R. Bilinsky

[57] ABSTRACT

An automatic tool changer in which tools carried by an indexable magazine are brought to a tool transfer station, from which a first one of two indepentently pivoted transfer arms of a tool transfer mechanism takes the tool from the magazine and — by X axis translation of the transfer mechanism — carries that tool to a tool-ready position close to the spindle, but held in an inverted position. Upon completion of the operation being performed by the tool in the spindle, and stopping of the spindle, the transfer mechanism is given Y axis translation and additional X axis translation, to bring the pivot axis of the two transfer arms to a spindle transfer position in which the second transfer arm is in position to swing in an arc tangent to the spindle axis, so that — upon 180° of such swinging motion — this second transfer arm is brought into position to grasp the tool in the spindle and, by swinging in the opposite direction, withdraw the tool from the spindle and hold it in an inverted position. Upon movement of the transfer mechanism back to its tool ready position, it undergoes Y axis translation to bring the first transfer arm into alignment with the spindle, so that — upon X axis translation of the transfer mechanism toward the spindle to the spindle transfer position — the first transfer arm carrying the tool it had removed from the magazine can be swung about its pivot axis to insert the tool in its grasp into the spindle.

19 Claims, 35 Drawing Figures

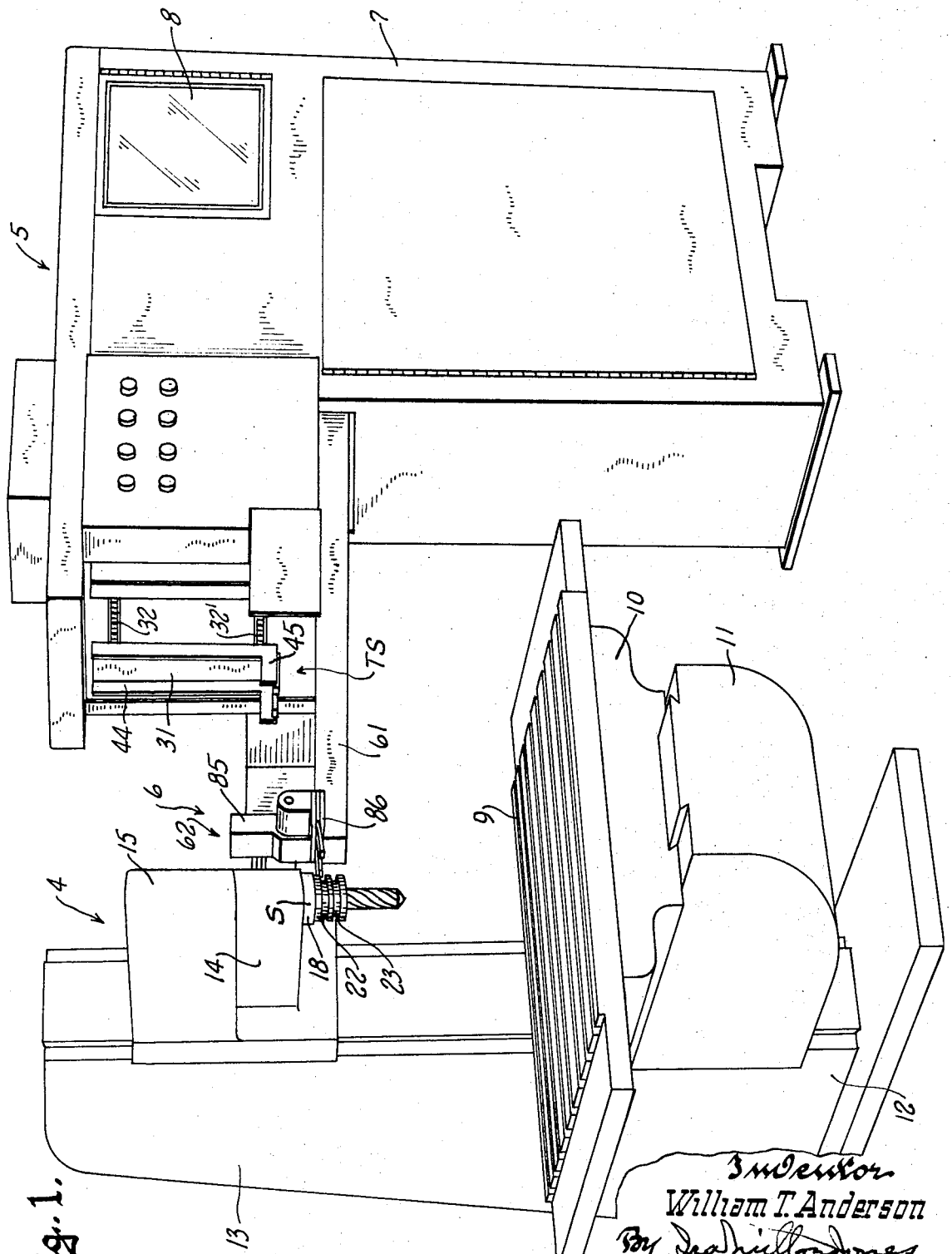

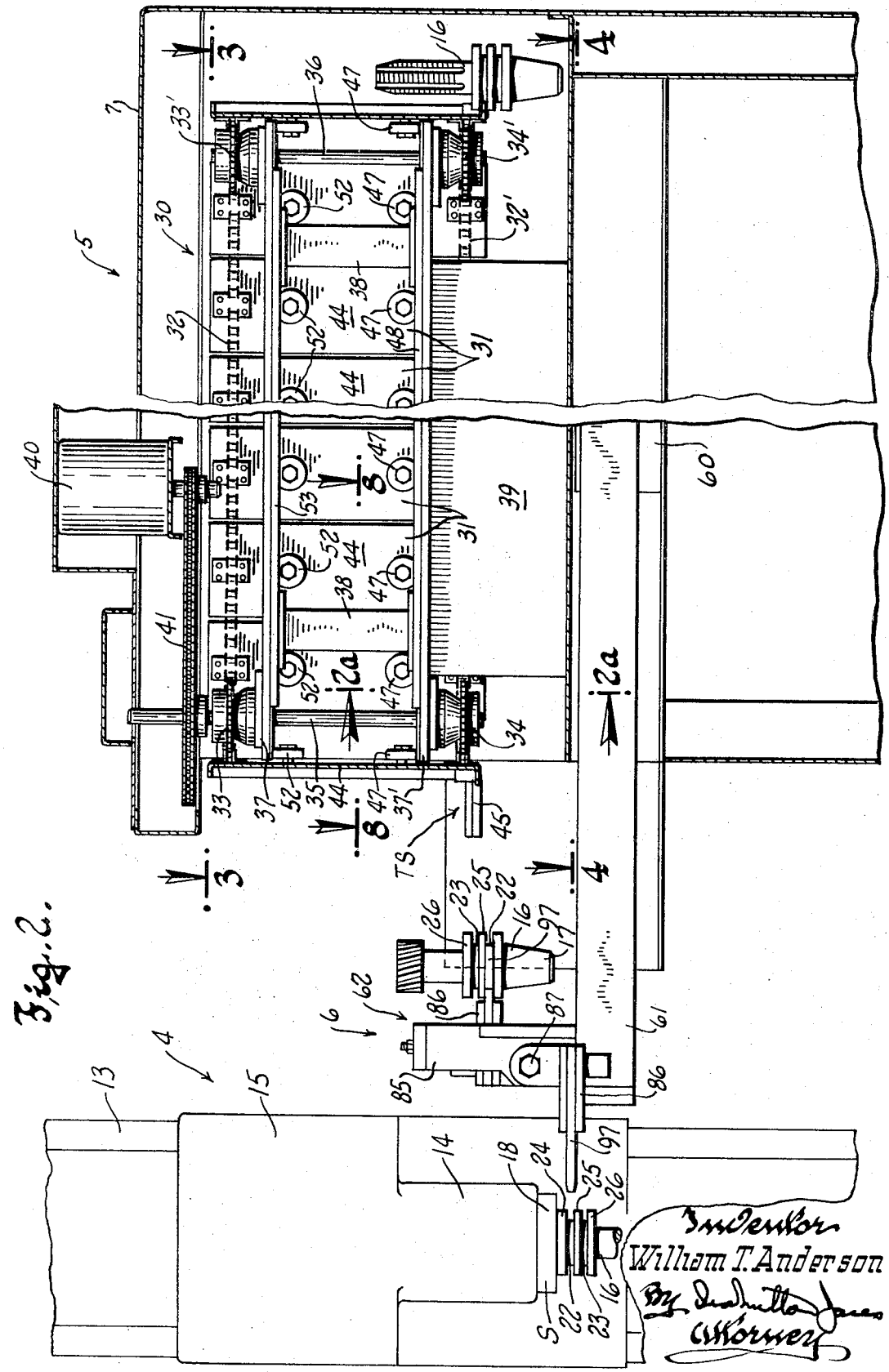

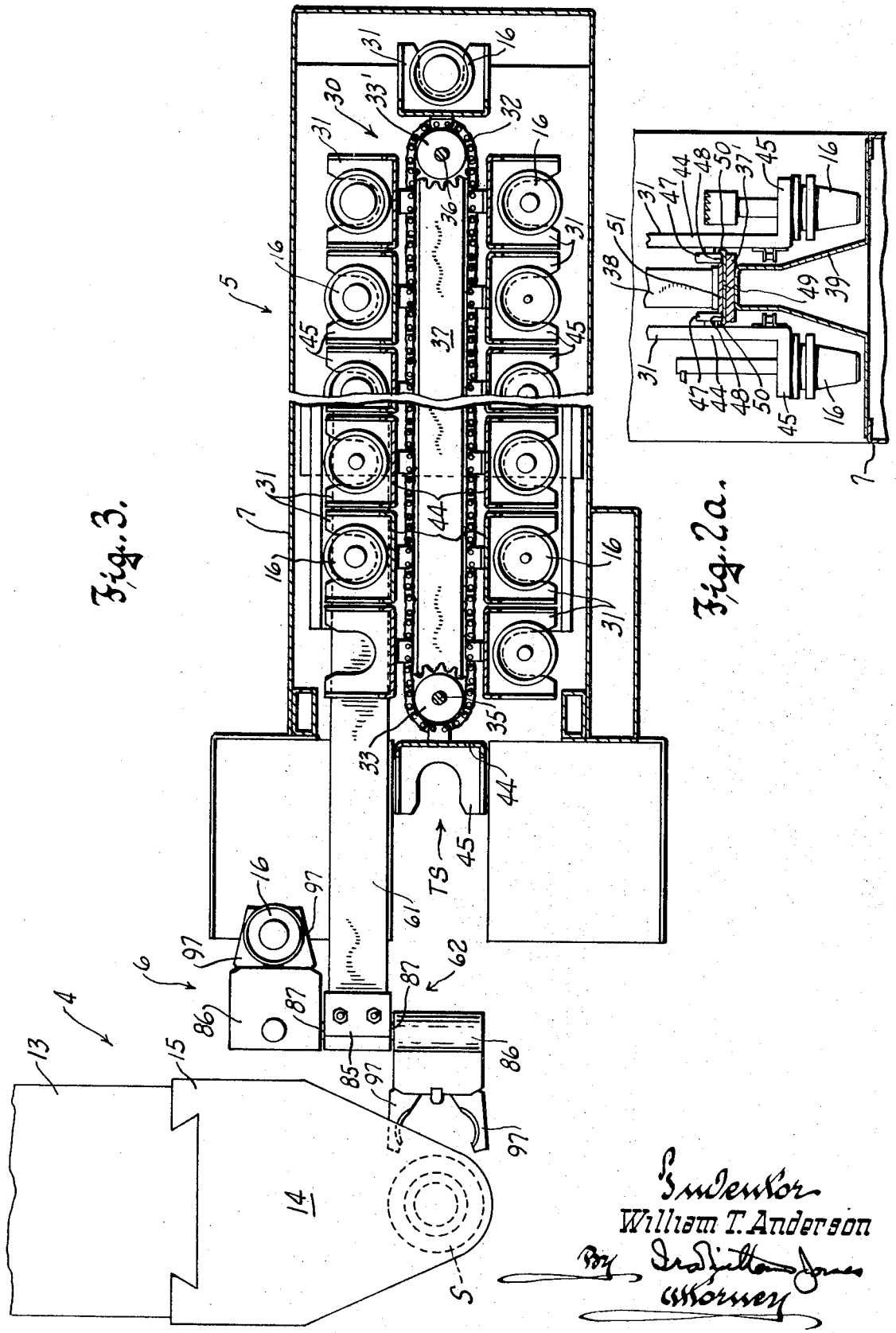

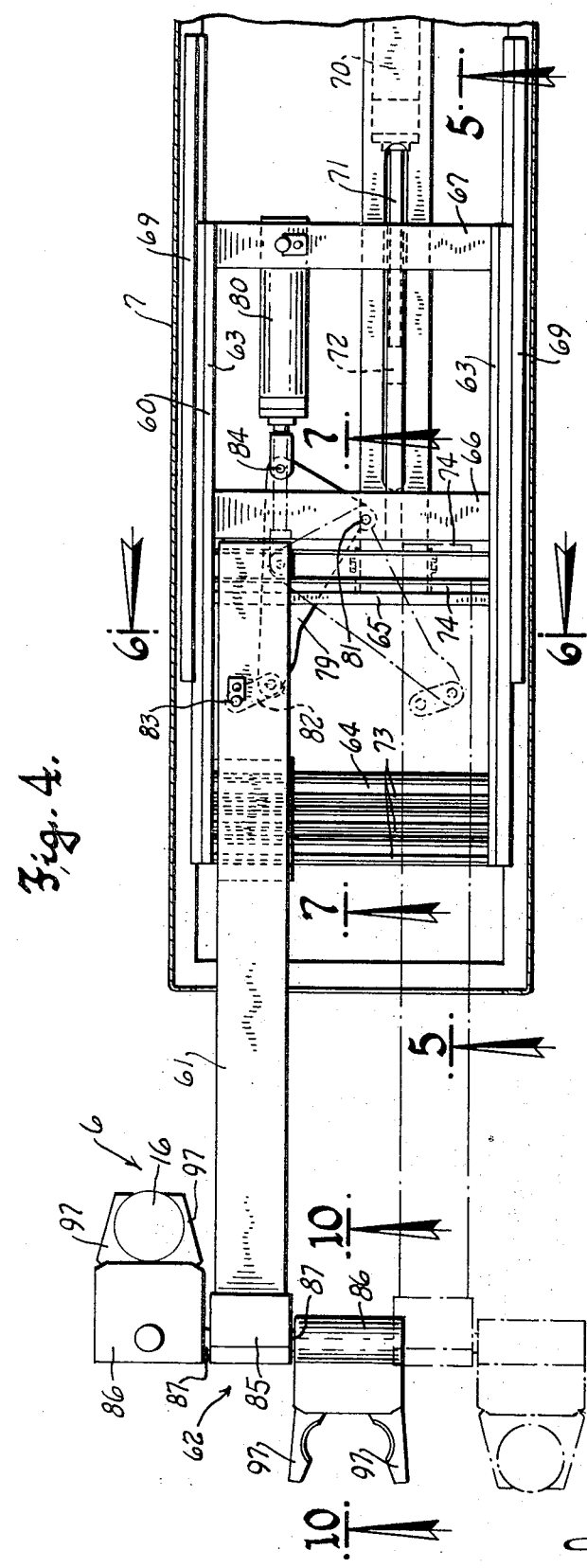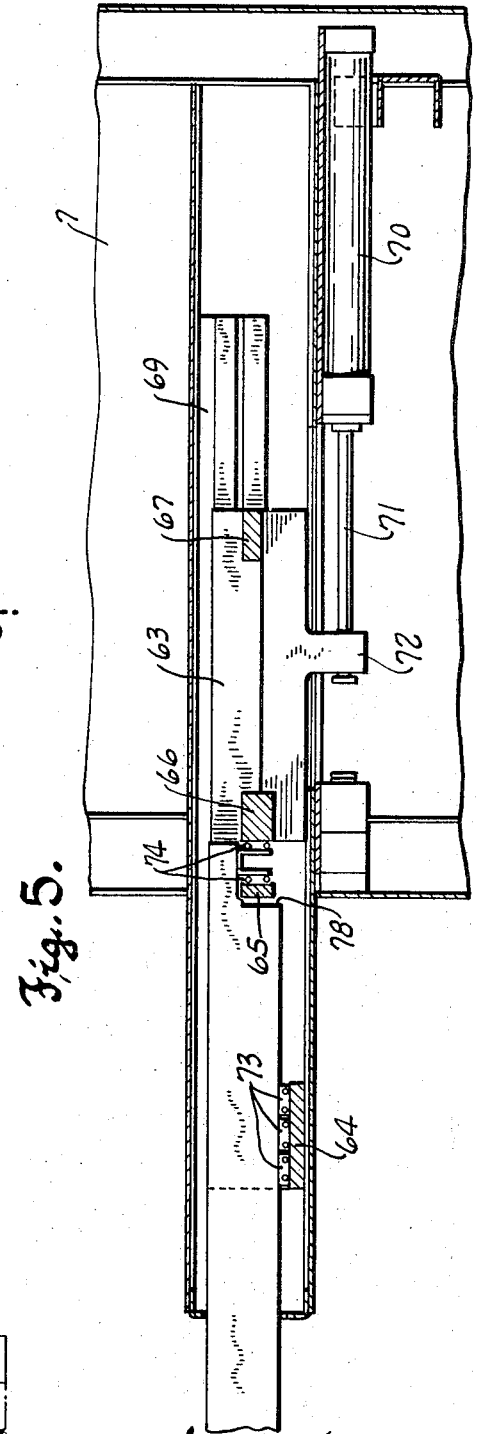

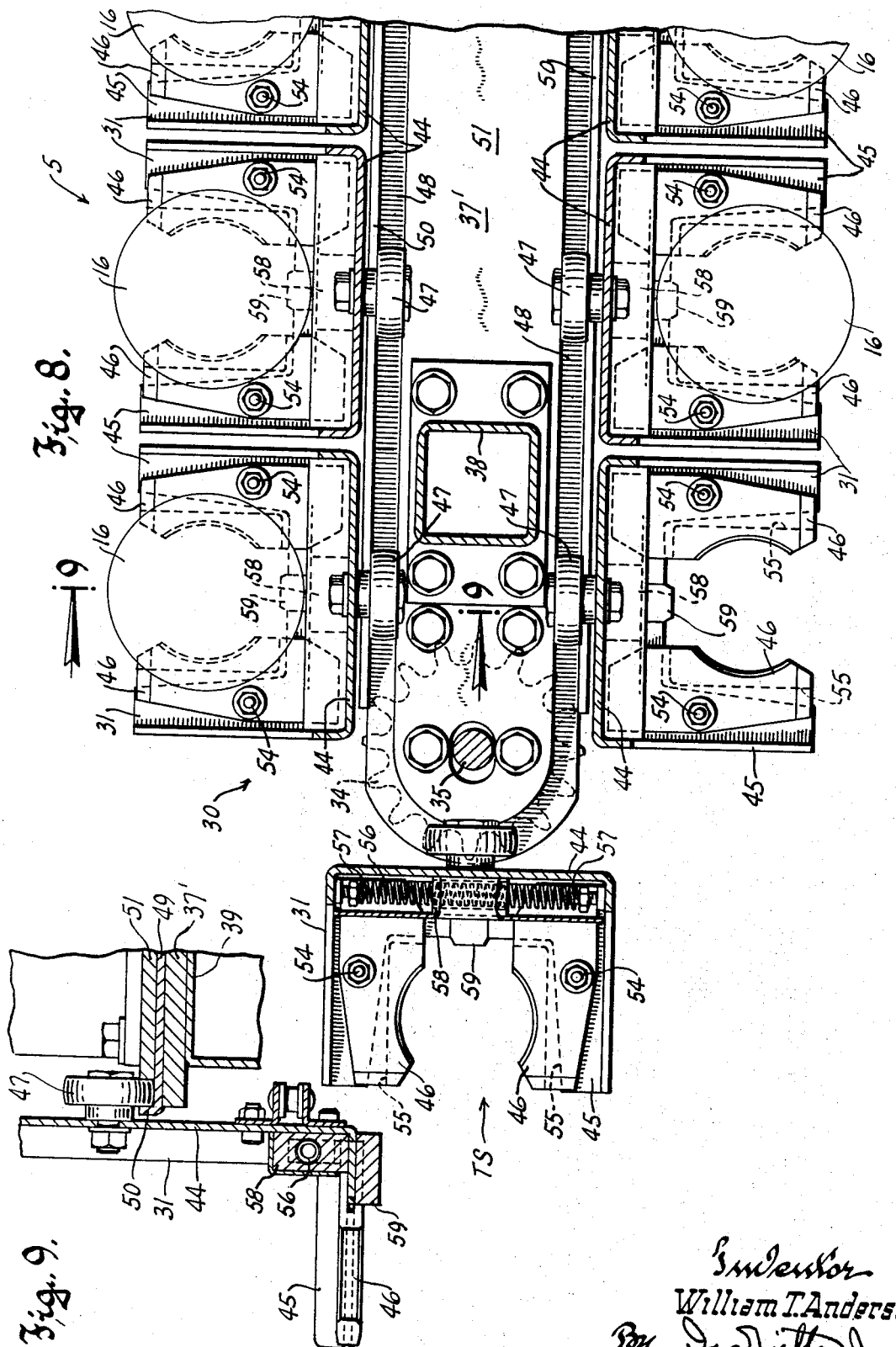

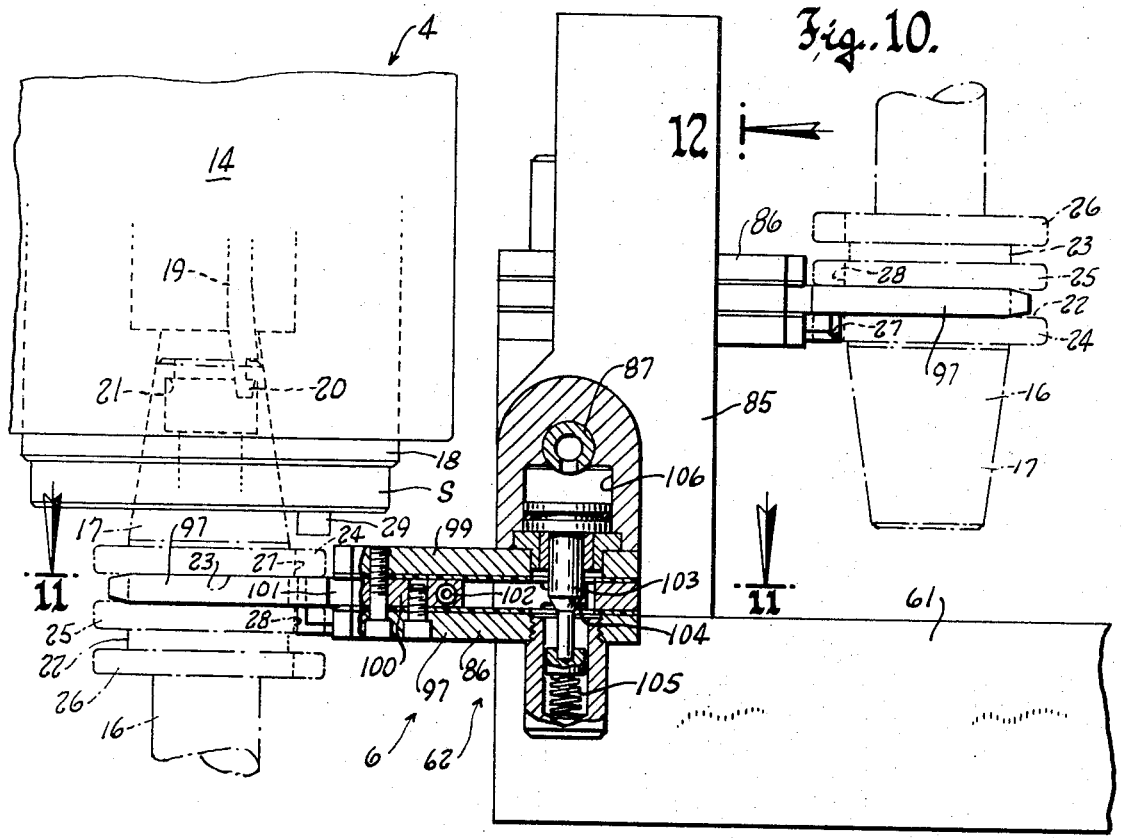
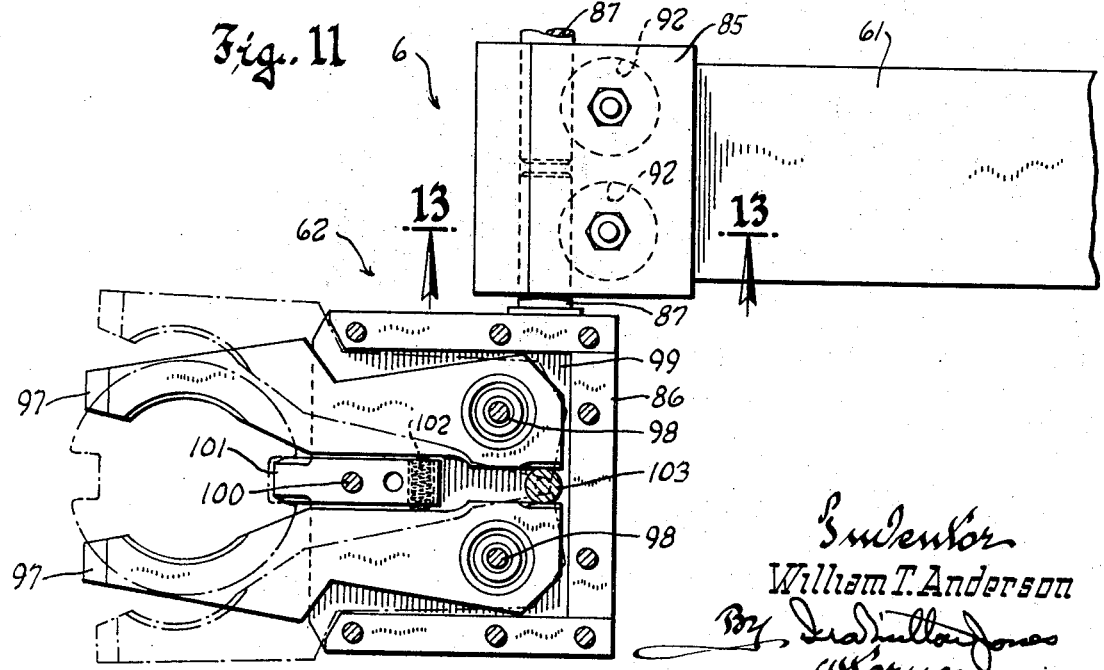

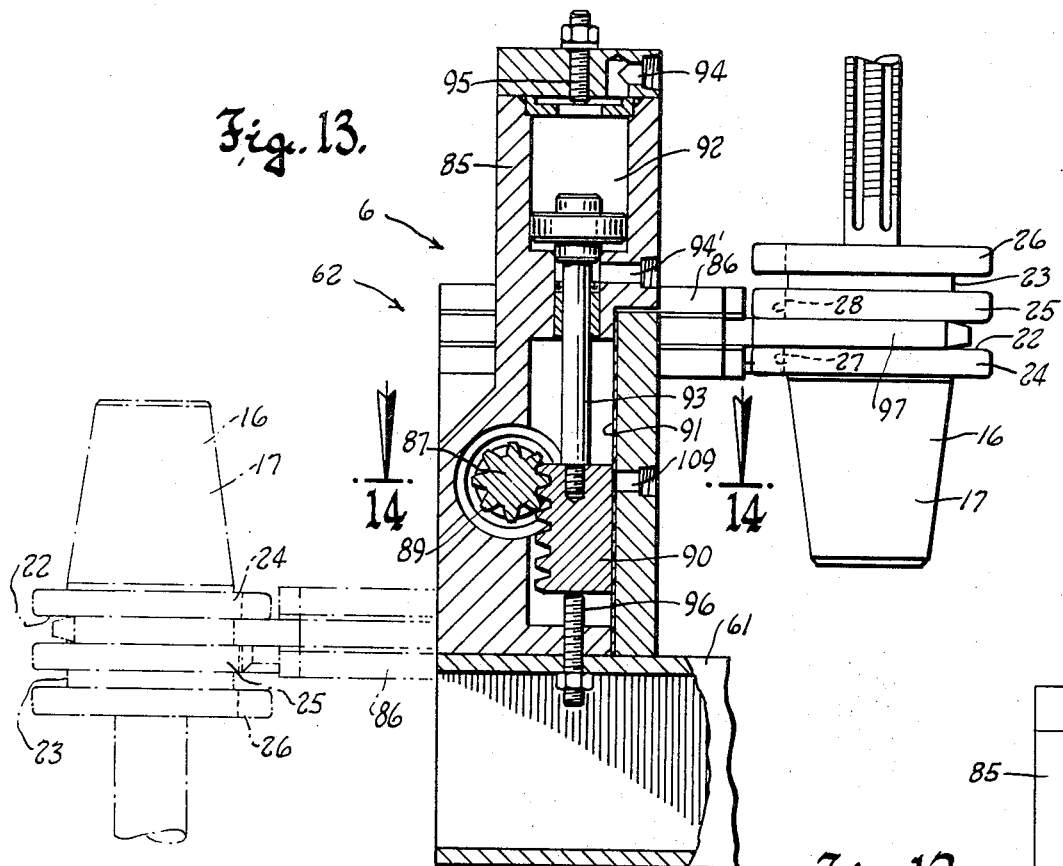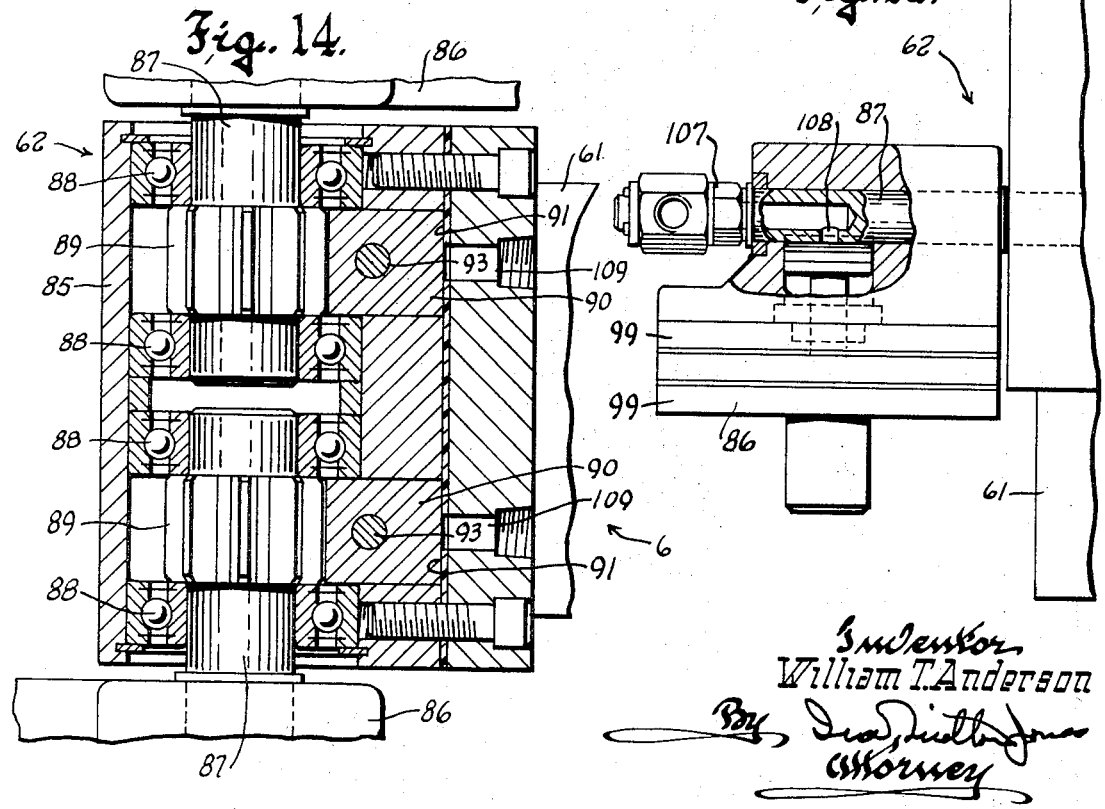

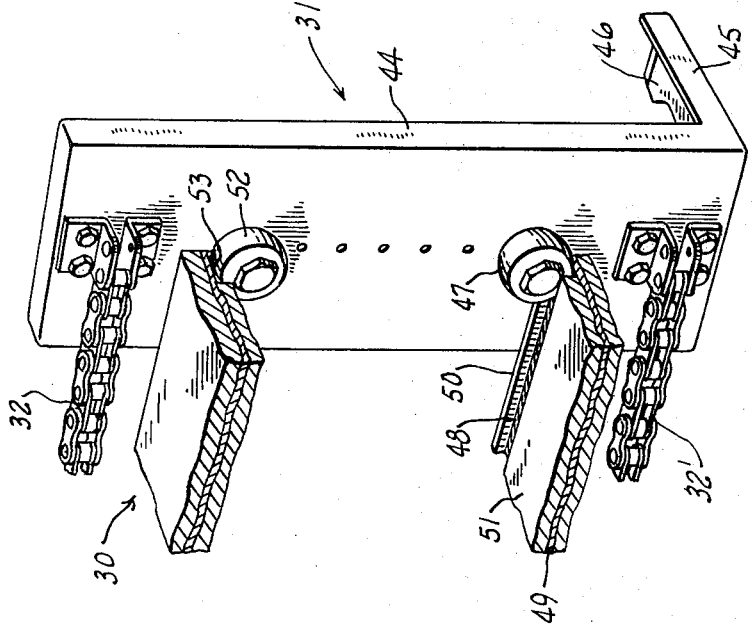
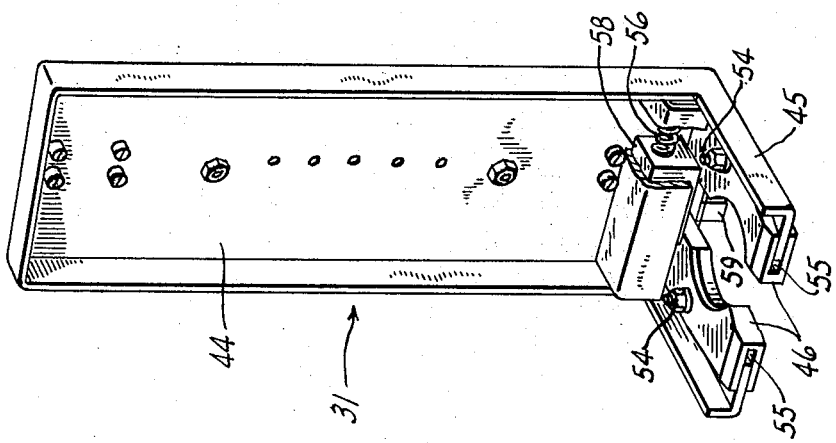

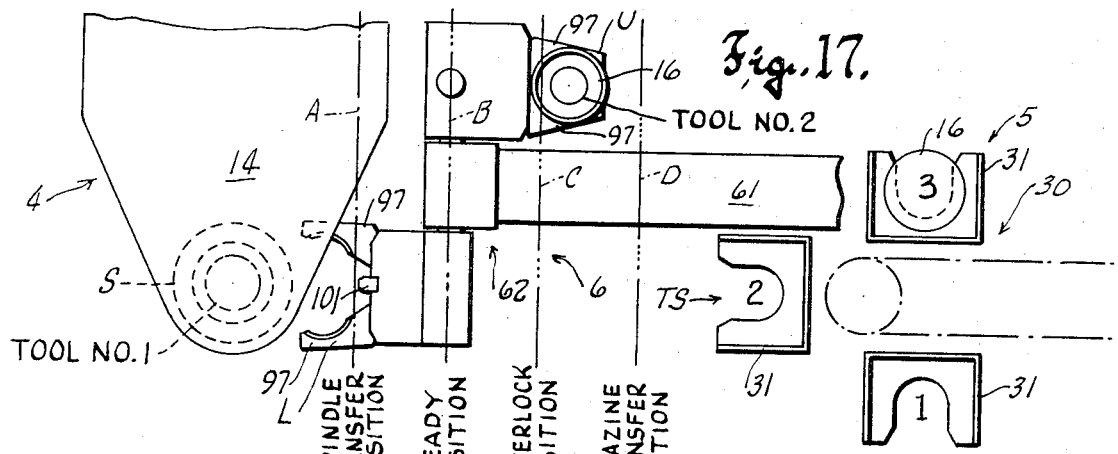
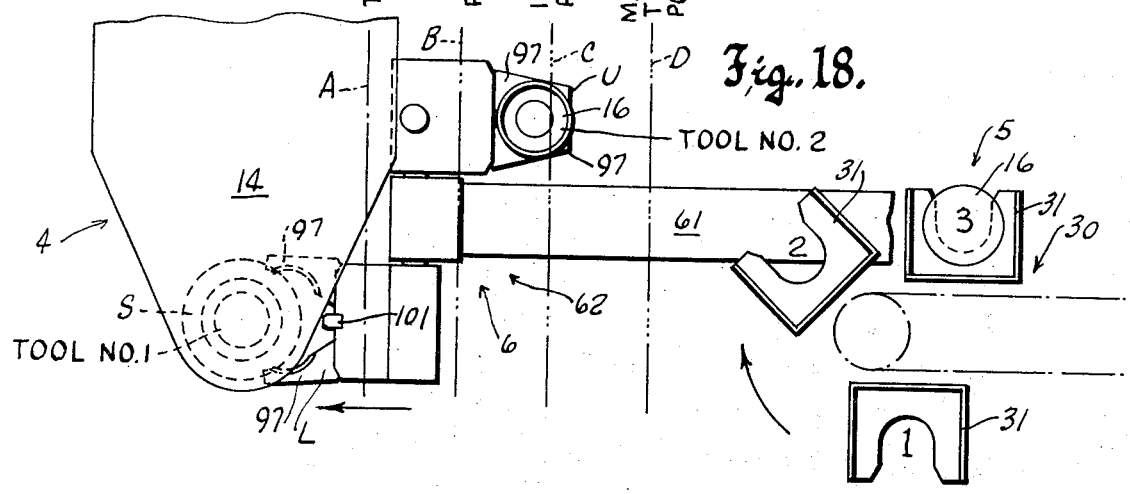
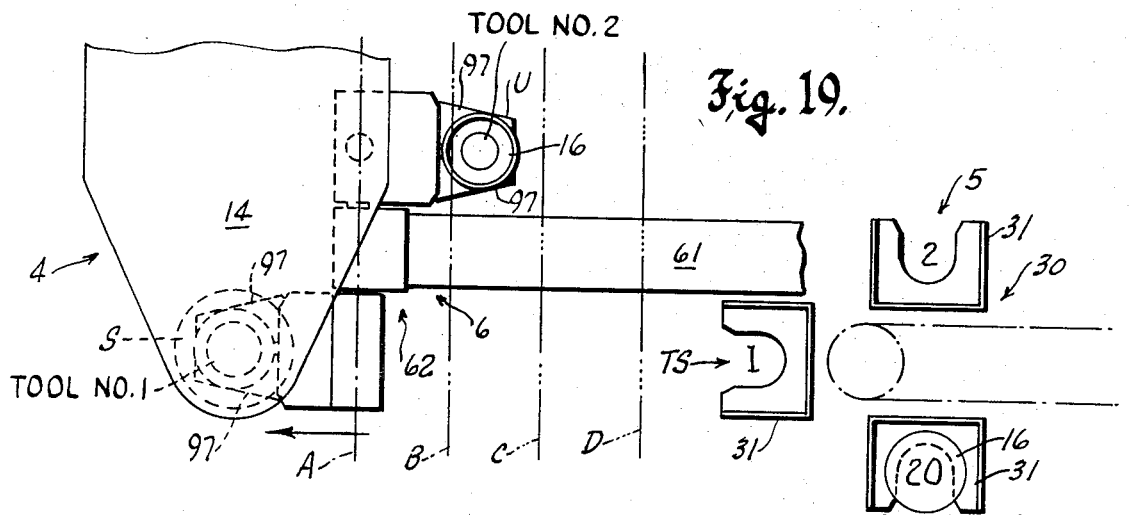

Inventor
William T. Anderson

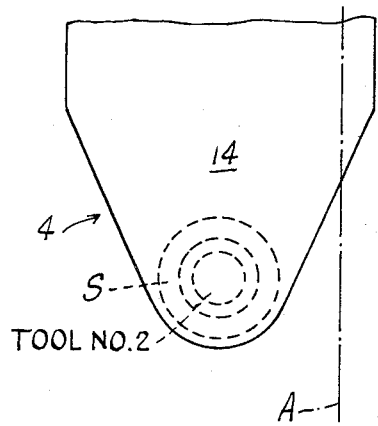
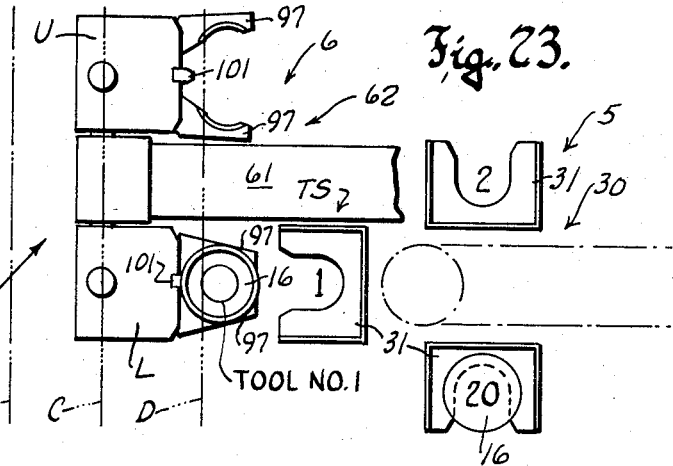
Fig. 23.
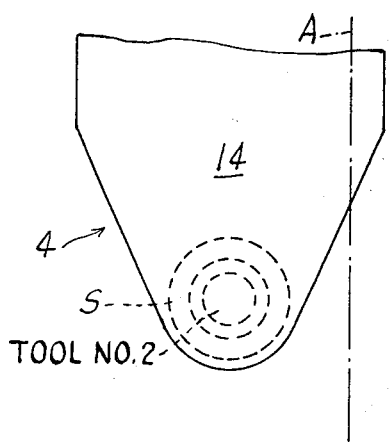
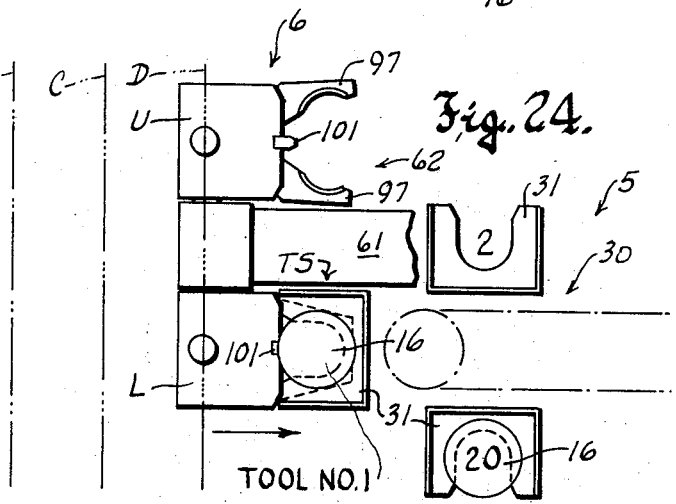
Fig. 24.
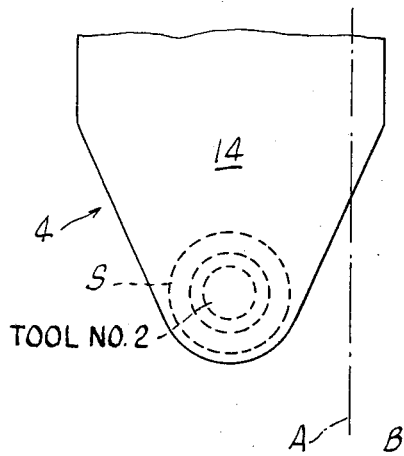
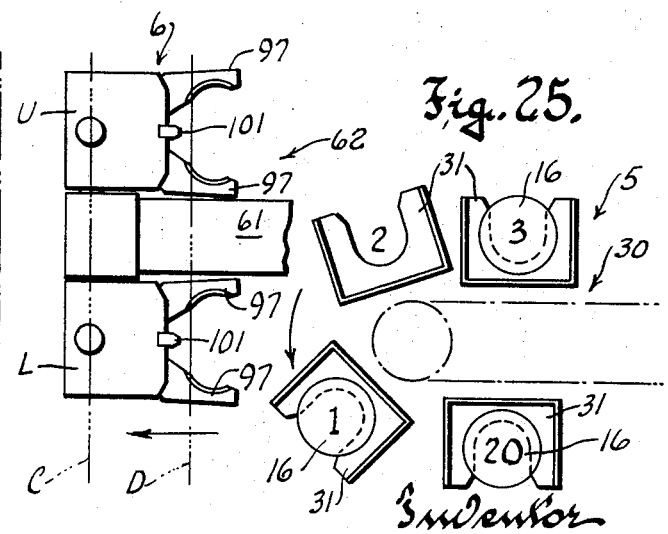
Fig. 25.
Inventor
William T. Anderson

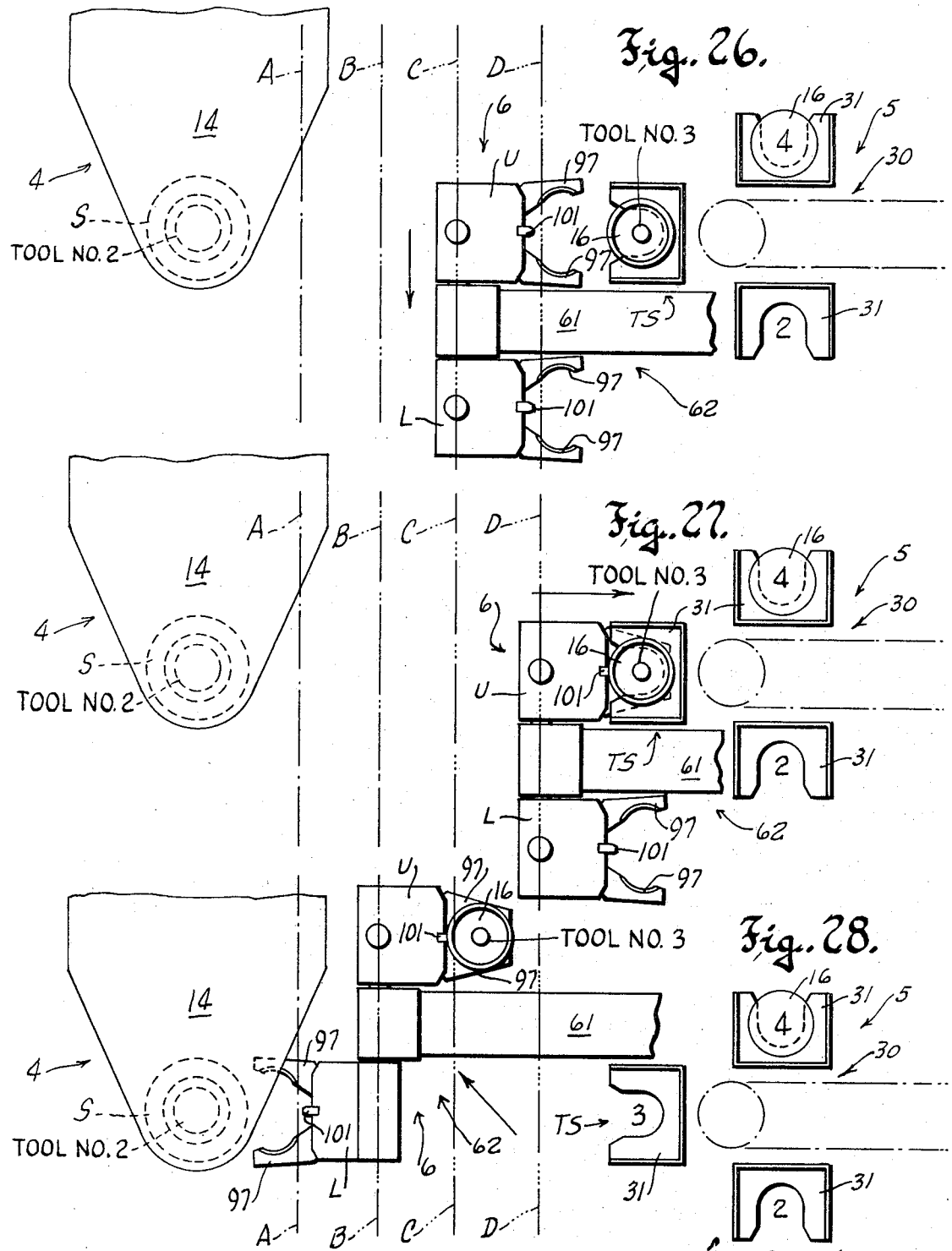

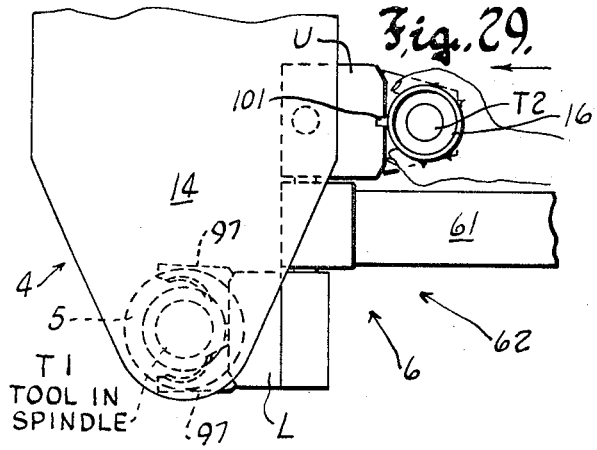
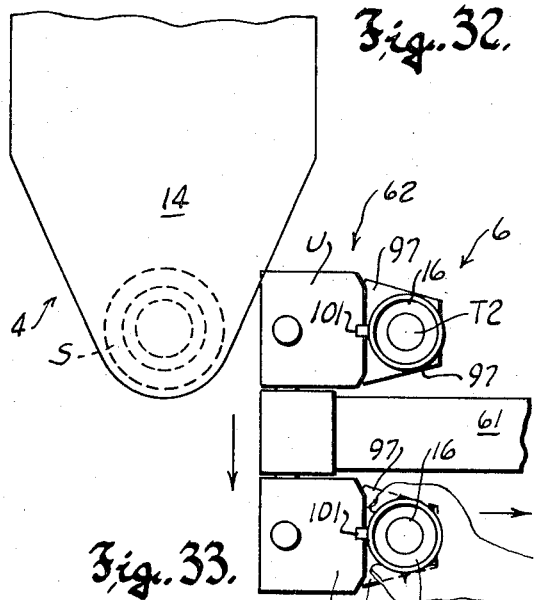
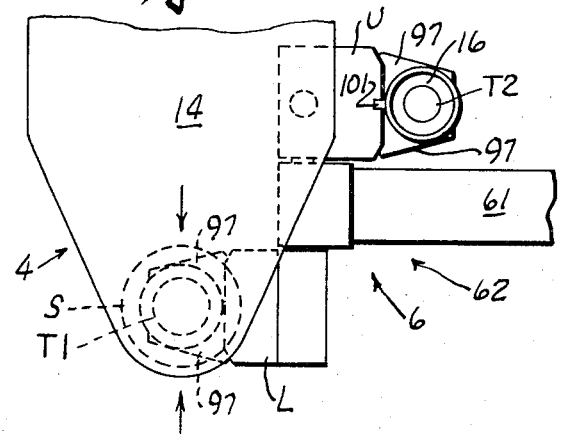
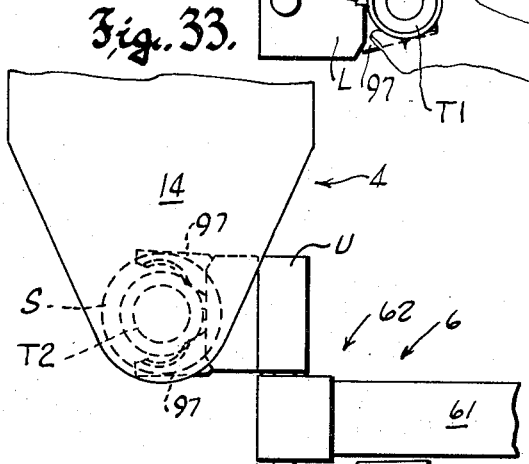
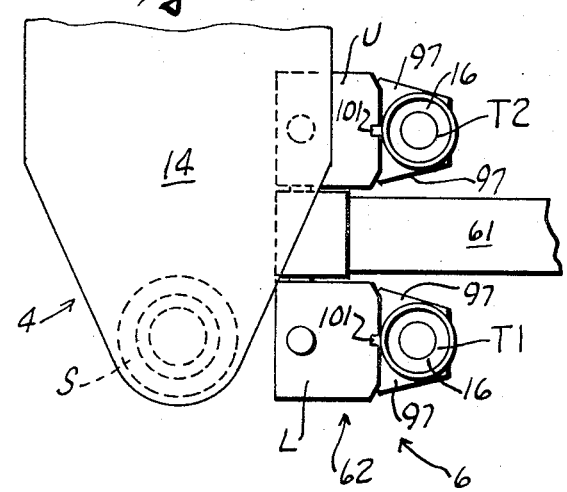
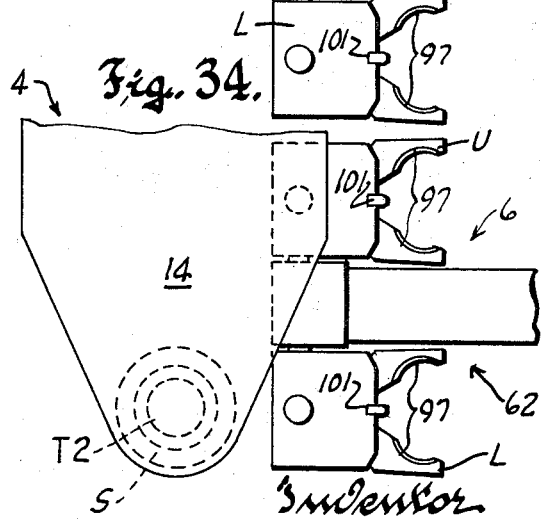

TOOL CHANGER

This invention relates to a tool changer for machine tools and, while by no means limited thereto, refers more particularly to an automatic tool changer for numerically controlled vertical milling machines.

In a vertical milling machine, the workpiece to be machined is placed upon a table that is mounted on the base of the machine for horizontal motion along two axes — the X axis and the Y axis. Any part of the workpiece thus can be brought into position to be acted upon by a tool secured to and driven by a spindle that rotates on a vertical axis above the work table and is carried by a spindle head mounted on the base of the machine for up and down motion along the Z axis of the machine.

With the addition of numerical control, all of the motions of the machine components along all three axes can be automatically effected and controlled in accordance with a predetermined program. However, unless the machine is also equipped with an automatic tool changer by which tools can be removed from a tool storage magazine and inserted into the spindle and also withdrawn from the spindle and returned to the storage magazine, much of the advantage of numerical control is not realized.

Machine tools equipped with automatic tool changers have been available for some time and several United States patents have been granted on such machines. Notable among those U.S. Pats. are the following:

Brainard et al. No. 3,286,344
Issued Nov. 22, 1966
Brainard et al. Reissue No. Re. 25,737
Issued Mar. 2, 1965
Meyer No. 3,316,629
Issued May 2, 1967
Meyer No. 3,466,971
Issued Sept. 16, 1969
Lehmkuhl No. 3,200,492
Issued Aug. 17, 1965
Hollis No. 3,412,459
Issued Nov. 26, 1968
Anthony No. 3,161,951
Issued Dec. 22, 1964
Swanson et al. No. 3,256,600
Issued June 21, 1966
Wakefield et al. No. 3,465,890
Issued Sept. 9, 1969
Harmon No. 3,466,739
Issued Sept. 16, 1969
Ollearo No. 3,545,075
Issued Dec. 8, 1970
Goebel et al. No. 3,551,984
Issued Jan. 5, 1971.

The British Patent No. 1,205,104, published Sept. 16, 1970, illustrates another prior art tool changer.

While the machines disclosed in some of the aforesaid patents are known to have achieved a measure of commercial success, in all of them the unproductive time spent in changing from one tool to another is a serious production-limiting factor.

With a view towards significantly minimizing the time required to effect a tool change, this invention has as its purpose and object to provide an improved tool changer for rotary spindle type machine tools, wherein:

1. transfer mechanism having two independently movable tool carrying arms that move with respect to one another operates to have one of its arms carry the tool that has just been removed from the spindle back to the tool storage magazine of the tool changer,
2. the magazine moves to bring the next-to-be-used tool to a transfer station, and
3. the transfer mechanism operates to have its other arm grasp that tool and transport it to a tool-ready station close to the spindle and also bring the other empty tool carrying arm into juxtaposition to the spindle, all while the spindle is rotating and the tool therein is performing a machining operation. The consequent close proximity to the spindle of both an empty transfer arm and the next-to-be-used tool makes it possible to interchange tools the instant the spindle stops and in a fraction of the time required with prior tool changers.

It is also an object of this invention to provide an improved tool storage magazine which is capable of carrying a large number of different tools, and of quickly bringing any one of the tools carried thereby to the transfer station of the tool storage magazine.

Another object of this invention is to provide a tool changer in which the insertion of a tool into the spindle and its withdrawal therefrom is effected with an arcuate motion rather than with a straight line movement, as is the case in most tool changers now in use. Inserting and removing the tool with an arcuate motion has the advantage of reducing the height of the clearance space required beneath the spindle to effect insertion or removal of a tool.

To further minimize the height of the clearance space required beneath the spindle for insertion and removal of a tool therefrom with an arcuate swinging motion, it is a feature of this invention that all of the tools are mounted in holders having tapered shanks, so that a very short axial separation between the tool holder and spindle allows the holder to be swung into and out of the correspondingly tapered socket in the collet of the spindle.

Still another object of this invention is to provide an automatic tool changer for a machine tool, which has no physical connection with the machine tool it serves, so that the vibration which inevitably results from operation of the tool changer mechanism is not imparted to the machine tool.

A further object of this invention is to provide a tool changer in which the holders for the various tools cooperate in a very efficient and effective manner with the tool transfer arms by which the tools are carried from the spindle to the tool storage magazine and vice versa, to the end that utmost accuracy is achieved in the placement of the tools in the spindle and their return to the tool storage magazine.

With these observations and objectives in mind, the manner in which the invention achieves its purpose will be appreciated from the following description and the accompanying drawings, which exemplify the invention, it being understood that changes may be made on the specific apparatus disclosed herein without departing from the essentials of the invention set forth in the appended claims.

The accompanying drawings illustrate one complete example of the embodiment of the invention constructed according to the best mode so far devised for the practical application of the principles thereof, and in which:

FIG. 1 is a perspective view of the tool changer of this invention shown in cooperative relation with a conventional vertical milling machine;

FIG. 2 is a vertical sectional view essentially through the tool storage magazine of the tool changer, showing a tool being held in the tool-ready station close to the spindle of the milling machine, part of the storage magazine being omitted;

FIG. 2a is a detail sectional view through FIG. 2 on the plane of the line 2a — 2a;

FIG. 3 is a horizontal sectional view through the tool changer on the plane of line 3 — 3 in FIG. 2;

FIG. 4 is a horizontal sectional view through FIG. 2 on the plane of the line 4 — 4;

FIG. 5 is a vertical sectional view through FIG. 4 on the plane of the line 5 — 5;

FIG. 8 is a horizontal sectional view on an enlarged scale, through a portion of the tool storage magazine, said view being taken on the plane of the line 8 — 8 in FIG. 2;

FIG. 9 is a vertical sectional view through FIG. 8 on the plane of the line 9—9;

FIG. 10 is essentially a vertical sectional view through FIG. 4 on the plane of the line 10—10;

FIG. 11 is a horizontal sectional view through FIG. 10 on the plane of the line 11—11;

FIG. 12 is a vertical sectional view through FIG. 10 on the plane of the line 12—12;

FIG. 13 is a vertical sectional view through FIG. 11 on the plane of the line 13—13;

FIG. 14 is a horizontal sectional view through FIG. 13 on the plane of the line 14—14;

FIG. 15 is a perspective view of one of the tool carriers of the tool storage magazine;

FIG. 16 is a perspective view of the back of one of the tool carriers of the tool storage magazine and illustrating part of the track structure by which the carriers are supported and part of the endless chains by which movement is imparted to the carriers;

FIGS. 17 through 28 are diagrammatic plan views of the tool transfer mechanism, illustrating a typical tool change sequence; and FIGS. 29 through 34 are diagrammatic plan views similar to FIGS. 16–28, but illustrating how the tool transfer mechanism of this invention can be employed to facilitate manual exchange of tools.

Figure 6:
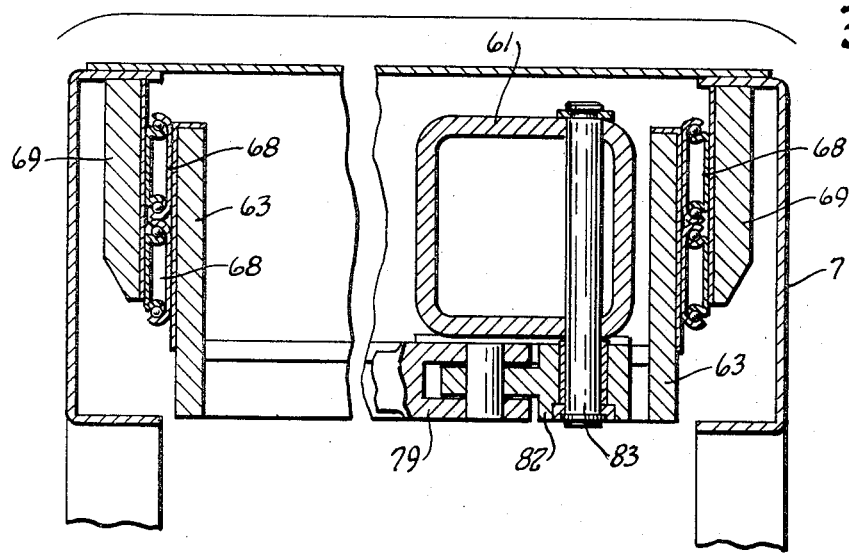
FIG. 6 is a vertical sectional view through FIG. 4 on the plane of the line 6 — 6.

Referring to the drawings, the numeral 4 designates generally a vertical milling machine of conventional design, but equipped with the automatic tool changer of this invention.

The tool changer, which comprises a tool storage magazine 5 and tool transfer mechanism 6, can be considered a machine entirely separate from the milling machine. It is contained within a cabinet-like main frame 7 that stands on its own foundation alongside the milling machine, and is so positioned with respect to the milling machine that its transfer mechanism 6 can take tools from the magazine — into which they are manually loaded through a door 8 — and transfer them to the spindle "S" of the milling machine, remove them from the spindle and return them to the tool storage magazine.

The transfer mechanism and the tool storage magazine and the manner in which they function will of course be described in detail. However, before doing so, it should be pointed out that the tool changer has no physical connection with the milling machine, except during the instant when a tool is actually being inserted into the spindle or withdrawn therefrom, at which time the spindle is stationary. Hence the performance of the milling machine, and particularly the accuracy of its machining operations, is not adversely affected by extraneous forces such as vibration and impact resulting from the operation of the tool changer in bringing different ones of the stored tools to a transfer station TS, or by the operation of the transfer mechanism as it carries tools between the spindle and the transfer station.

The milling machine, as is customary, has a work table 9 slidably mounted upon a saddle 10 for left and right traverse along the X axis of the machine, and by in and out movement of the saddle 10 can be moved along the Y axis. The saddle 10 is carried by the knee 11 of the machine which is vertically adjustably mounted on the base 12. A column 13 projecting from the base 12 behind the work table has a spindle head 14 vertically slidably mounted thereon and the spindle S — as well as its drive transmission 15 — is carried by the spindle head. The spindle is, of course, located above the work table and, by up and down motion of the spindle head, is movable along the Z axis. The machine is therefore capable of performing any machining operation that does not require more than three axis relative motion between the workpiece and the spindle driven tool.

Any one of a wide variety of tools can be attached to the spindle to be driven thereby. This includes drills, reamers, boring bars, taps and milling cutters of all types. Each tool is fixed in a tool holder 16. All of the holders are identical and have a steeply tapered shank 17 which fits into a correspondingly tapered socket in the collet 18 of the spindle, where it is held by a draw bar 19 that extends axially through the spindle. Since the draw bar and the manner in which it functions forms no part of the invention, it is merely indicated in dotted lines in FIG. 10. However, it is important to observe that the tool transfer mechanism by which the tools are inserted into the spindle, holds the tools at a fixed elevation during the attachment of a tool to the spindle. It is essential, therefore, that the relative axial motion required between the draw bar and the spindle to effect attachment of the tool to the spindle be effected without imparting any endwise movement to the tool.

Although other means may be employed to connect the tool holders to the draw bar, a satisfactory way of doing so is by means of radially expandable claws 20 on the draw bar which enter a reentrant socket 21 in the tool holders and engage under a ledge at the mouth of the socket. After a tool holder is thus connected to the draw bar, the tool can be released from the transfer mechanism and drawn up into the spindle to tightly wedge the tapered shank 17 into the correspondingly tapered socket of the spindle collet.

All of the tool holders have two circumferential grooves 22 and 23 axially spaced from the large diameter end of the tapered shank 17 and from each other, the groove 22 being nearest the shank. The grooves are defined by three flanges 24, 25 and 26. The surfaces of these flanges which define the sides of the grooves are flat and accurately normal to the axis of the tool holder; and the flanges 24 and 25 which are nearest the shank of the holder have aligned diametrically opposite keyways 27 and 28 respectively. The keyways 27 receive keys 29 that project from the bottom of the spindle to positively drivingly connect the tool holder and the tool therein to the spindle.

To assure entry of the keys 29 into the keyway 27, the spindle must always be stopped in one position of rotation, which is the responsibility of the numerical control instrumentalities governing the operation of the machine. It is also necessary that the tool holders are always presented to the spindle in the same position of rotation. This is assured by providing the tool transfer mechanism and the tool storage sockets of the magazine with keys that enter the keyways 28.

An advantage that flows from always stopping the spindle in the same position of rotation is that it facilitates withdrawal of a boring tool from a hole that has just been bored. By inserting the boring tool into its holder with the cutter in a specific rotary orientation with respect to the keyways of the holder, the cutter will be in a definite location with respect to the X and Y axes of the machine when the spindle stops. It is then a simple matter to have the control effect movement of the work table in the direction to disengage the cutter from the side of the hole, whereupon it can be lifted from the hole without marring its surface.

While the tool holders by which the various tools are held are, strictly speaking, no part of the tools, for convenience in description, where the term "tool" either singular or plural, is used in this specification and in the claims, it will be understood to include the tool holder or holders unless otherwise stated.

It should also be understood that different tools will require different spindle speeds and different feed rates, as well as the application of coolant thereto as they perform their respective machining operations; and, for milling and contouring, the work table must be moved along its coordinate axes, but all of these requirements can be met by an appropriate control system which governs the operation of the machine but is not a part of this invention.

The control system also effects selection of the tool to be withdrawn from the tool storage magazine and the operation of the tool transfer mechanism by which the selected tool is inserted into the spindle and a tool in the spindle is returned to the tool storage magazine.

THE TOOL STORAGE MAGAZINE

The tool storage magazine comprises essentially an endless conveyor 30 which travels in an elongated narrow orbit and has a plurality of tool carriers 31 thereon. The tool carriers can be regarded as storage sockets, and each always receives and holds the same tool. The conveyor consists of two endless sprocket chains of the same length, an upper chain 32 and a lower chain 32', the upper chain being trained about sprockets 33-33' and the lower chain about sprocket 34-34'.

The sprockets 33 and 34 are fixed to a vertical shaft 35 and the sprockets 33' and 34' are fixed to a similar shaft 36. These shafts are journaled in bearings mounted upon the end portions of elongated upper and lower rails 37-37' which are rigidly connected by a pair of uprights 38 to form a backbone for the conveyor. The lower rail 37' is secured to the top of an inverted U-shaped rib 39 that extends lengthwise down the middle of the main frame and is an integral part thereof.

The bearings in which the vertical sprocket shafts 35 and 36 are journalled are on the top side of the upper rail 37 and at the underside of the bottom rail 37', and collars fixed to the shafts above the upper bearings and below the lower bearings hold the shafts against endwise displacement with the upper sprockets 33-33' above the upper rail and the lower sprockets 34-34' beneath the lower rail. The distance between the sprockets at the opposite ends of the conveyor — and hence the tension on the chains — is of course adjustable in the conventional manner, and to drive the conveyor a reversible fluid pressure motor 40 mounted on the main frame is drivingly connected with the shaft 35 through a positive traction drive chain 41 trained over a small drive sprocket and a large driven sprocket. Hence, by controlled operation of the motor 40, the conveyor can be actuated to bring any one of its tool carriers 31 to the transfer station TS which is at the end of the conveyor defined by the sprockets 33 and 34 on the shaft 35.

The carriers 31 are all alike and consist of L-shaped members, preferably formed of sheet metal, with a long vertical leg 44 and a short horizontal leg 45. They are attached to the endless chains with their upper ends extending above the upper chain 32 and the lower ends below the chain 32', and the short horizontal leg 45 projecting outwardly of the conveyor orbit. This leg 45 is bifurcated and has complementary tool gripping jaws 46 thereon, the nature of which will be described later.

Quite obviously, the combined weight of the tools in the magazine is substantial, especially when — as in the present case — the tool storage magazine is designed to hold twenty tools. To carry that weight without imposing any of it upon the conveyor chains, each tool carrier has a roller 47 freely rotatably mounted thereon and riding on a track 48 which forms part of the lower rail 37'. The track actually consists of an elongated channel 49, the flanges 50 of which are spaced from and coact with the parallel side edges of a flat bar 51 symmetrically overlying the channel. At the ends of the roller tracks, the flanges 50 of the channel are cut away and the ends of the bar 51 are rounded and concentric to the axes of the sprockets. This permits the rollers 47 to negotiate the turns at the ends of the elongated conveyors' orbit. FIG. 8 illustrates this detail.

Coacting with the roller 47 of each carrier 31 is a second roller 52 near the top of the carrier which rides in a track 53 at the underside of the upper rail 37. Since the rollers 47 and 52 are held against axial displacement by the sides of their respective tracks, the carriers 31 are firmly held against any motion other than their intended travel around the orbit of the conveyor. FIG. 16 illustrates the manner in which the carriers are supported and held in position, and also shows the attachment of the carriers to the conveyor chains.

The tools are initially manually loaded into the carriers of the conveyor in an inverted upside-down orientation with respect to their operative positions when attached to the spindle, and are held in this position by the complementary gripper jaws 46. These jaws are pivoted, as at 54, to the bifurcated short horizontal leg 45 of the carriers and grip the tools by entering the grooves 23 in their tool holders. By virtue of the accurately normal disposition of the flat sides of the flanges 25 and 26, which define the groove 23, to the axis of the tools and snug reception of the jaws 46 between the flat sides of the flanges, the tools are firmly held with their axes accurately vertical. FIGS. 8, 9 and 15 provide the best illustration of the gripper jaws and their operation. As there shown, and especially in FIG. 15, the jaws have deep grooves 55 in their outer edges to receive the marginal portions of the short leg of the carrier that bound the bifurcation therein. Hence the jaws have a tongue and groove connection with the short leg of the carrier, as well as being pivoted thereto.

The jaws are yieldingly retained in operative tool gripping positions by a spring 56 confined between abutments 57 on the rear portions of the jaws. The spring is held in placing by having its medial portion received in a bore through a block 58 which is fixed with respect to the carrier. A key or locking lug 59 is also fixed with respect to the carrier between the gripper jaws and at the underside of the bifurcated short leg of the carrier, to enter one of the keyways 28 in the flanges 25 of the tool holders, and thereby hold the latter and the tools therein against rotation out of a predetermined orientation while in the tool storage magazine.

THE TRANSFER MECHANISM

The transfer mechanism, indicated generally by the numeral 6 comprises a carriage 60 slidably mounted on the main frame 7 at an elevation beneath the tool storage magazine, for back and forth horizontal movement towards and from the spindle along the X axis of the machine, a shuttle bar 61 carried by the carriage and a transfer arm assembly 62 on the shuttle bar.

The carriage 60 is a rigid frame-like structure with parallel side rails 63 connected by cross bars 64, 65, 66 and 67 (FIGS. 4 and 5). It is slidably mounted in the main frame by ball bearing slides 68, the coacting elements of which are respectively fixed to the side rails 63 and ridged longitudinally extending members 69 solidly secured to the main frame 7.

Back and forth traverse of the carriage is produced by a double acting fluid pressure motor 70, preferably a hydraulic cylinder, fixedly mounted in the main frame with its piston rod 71 connected to the carriage, as at 72. Since it is important that the transfer arm assembly 62 be in a definite location when retracted with respect to the tool transfer station TS and also when in its projected position delivering a tool to the spindle, the limits of the traverse imparted to the carriage by the motor 70 must be accurately set. This, however, can be done in any suitable and conventional manner.

The shuttle bar 61 is a rigid structure transversely translatably mounted on the carriage to travel therewith along the X axis as the carriage is moved towards and from the spindle, and with respect thereto along the Y axis, but always with the shuttle bar horizontally oriented. These requirements are met by mounting the shuttle bar on the cross bars 64, 65 and 66 of the carriage by means of ball bearing slides 73 and 74, the coacting elements of which are respectively fixed to the shuttle bar and to the carriage cross bars. In each instance, the element of the slide which is fixed to the shuttle bar extends only across the width of the shuttle bar, but its coacting element which is fixed to the carriage extends along the entire length of the carriage cross bar to which it is fixed. This permits the shuttle bar to move all the way from one side of the carriage to the other, and since the transfer arm assembly 62 is symmetrically mounted on the shuttle bar, proper correlation between the limits of transverse motion of the transfer arm assembly and the spindle is assured by positioning the tool changer with the longitudinally extending vertical median plane of the carriage coincident with the spindle axis.

Figure 7:
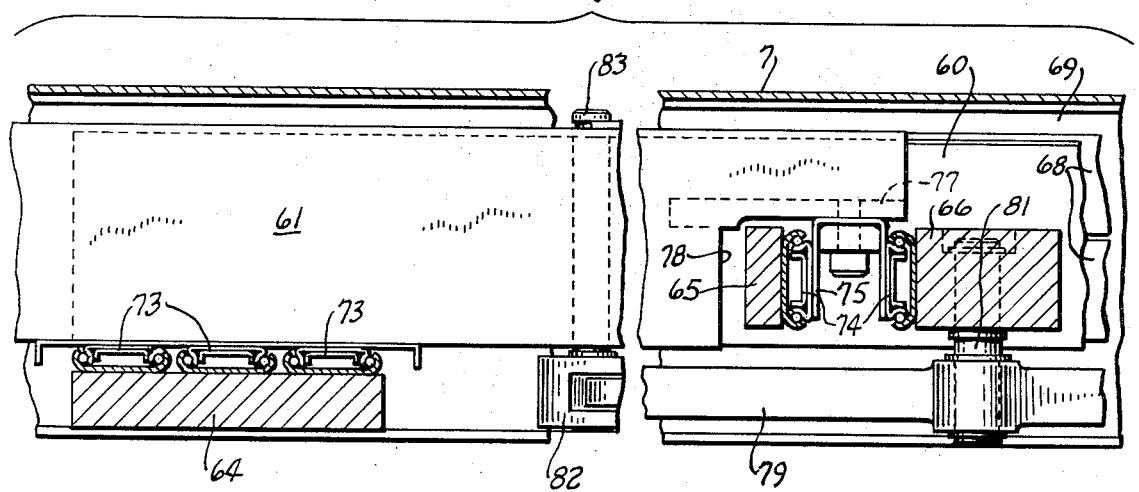
FIG. 7 is a vertical sectional view through FIG. 4 on the plane of the line 7 — 7.

As best seen in FIG. 7, the coacting elements of the slides 73 are secured to the top of the cross bar 64 and the underside of the shuttle bar; but the slides 74 have their carriage-carried elements fixed to the opposing faces of the cross bars 65 and 66 and their shuttle bar-carried elements fixed to the flanges of a channel 75 which is pivotally secured, as at 75, to the underside of the shuttle bar — specifically to a plate 77 which spans the sides of the hollow shuttle bar above a cutout 78 in its inner end portion. By locating the connection between the inner end of the shuttle bar and the carriage in the cutout 78, space is available directly beneath the bottom of the shuttle bar for a bell crank lever 79 through which a fluid pressure motor 80 imparts transverse translatory motion to the shuttle bar.

The bell crank lever 79 is pivoted to the underside of the cross bar 65, as at 81, and has one arm thereof — its longest — connected with the shuttle bar through a link 82, one end of which is pivoted to the shuttle bar by a pin 83. The presence of the link in the connection between the bell crank lever and the shuttle bar enables the shuttle bar to be constrained to translatory motion, despite the fact that the end of the bell crank connected therewith moves in an arc. The fluid pressure motor 80 has its cylinder connected to the cross bar 67 of the carriage and its piston rod connected to the short arm of the bell crank lever, as at 84.

True translatory motion of the shuttle bar with respect to the carriage is assured by leaving the guidance of that motion to the slides 73 and pivotally connecting the slides 74 with the shuttle bar.

The transfer arm assembly comprises a supporting body 85 rigidly fixed to and rising up from the shuttle bar at its end nearest the spindle. This supporting body is flanked by two transfer arms 86 that are pivoted thereto to swing independently of one another about a common axis.

The transfer arms are identical and swing through 180° in arcs that lie in vertical planes, one of which coincides with the vertical plane containing the spindle axis and bisecting the transfer station TS when the shuttle bar is at one of its limits of transverse Y axis motion, and the other of which does so when the shuttle bar is at its opposite limit of Y axis motion.

To pivotally mount the transfer arms 86 on the shuttle bar-carried body 85, each arm has a shaft 87 fixed in its body portion and projecting therefrom to be journalled in bearings 88 mounted in a transverse bore through the body 85, (FIG. 14). A pinion 89 on each shaft 87 meshes with a rack 90 that is slidably mounted in a cavity 91 in the body, and by controlled reciprocation of the racks arcuate swinging motion is imparted to the transfer arms. The racks are reciprocated by double acting cylinders 92 formed in the body 85 and having their pistons connected to the racks by rods 93. Pressure fluid is delivered to the opposite ends of the cylinders through ducts (not shown) that connect with ports 94-94' as valves in the control system of the machine are automatically opened and closed; and, to accurately define the limits of swinging motion imparted to the transfer arms, adjustable stops 95 and 96 limit the stroke of the racks. It should be noted that the transfer arms are not connected to each other and that they swing independently of one another.

To enable the transfer arms to carry tools, each arm has a pair of jaws 97 that are mirror images on one another, pivotally mounted thereon, as at 98. These jaws have their mounted end portions received in chambers defined by overlying plates 99 that are secured in spaced apart relation to the body portion of the arm, (FIGS. 10, 11 and 12). Part of the means holding the plates 99 spaced apart is a block 100 which is situated between the arms and projects from the chamber to provide a locating lug or key 101 to engage in one of the notches 28 in the flanges 25 of the tool holders 16 gripped by the jaws. In this manner, the tools are held in correct rotational orientation during their transfer to and from the spindle. A spring 102 that is received in a transverse bore in the block 100 at all times yieldingly urges the jaws apart and opens them to release a gripped tool when a control plunger 103 permits opening motion of the jaws. The inner end portions of the jaws are held in contact with the control plunger by the spring.

The control plunger 103 has a large diameter end portion and a small diameter end portion with a tapered shoulder 104 therebetween. The plunger is mounted in the transfer arm for endwise motion along an axis that intersects the pivot axis of the arm and is equispaced from and inwardly of the axes about which the jaws pivot. In its operative position, the large diameter portion of the plunger engages the opposing edges of the jaws and holds the jaws closed; while in its inoperative position the small diameter portion of the plunger is between the engaged edges of the jaws, permitting the spring 102 to open the jaws.

A spring 105 bearing against the small diameter end of the plunger yieldingly urges the plunger to its inoperative position, and to move the plunger to its operative position, a piston at the large diameter end of the plunger operates in a cylinder 106 formed in the body portion of the arm. Fluid pressure is introduced into the cylinder when the jaws are to be closed, and in moving from its inoperative to its operative position, the tapered shoulder 104 cams apart the opposing edges of the jaws and positively closes the jaws. Fluid pressure is introduced into the cylinder through a swivel joint 107 (FIG. 12) that is mounted on the adjacent end of the shaft 87. The swivel joint opens to a bore extending axially into the shaft 87 far enough to have its inner end communicate with the cylinder 106 through a transverse port 108. The swivel joint, of course, enables the cylinder to be connected with a pressure source without interfering with the swinging movement of the transfer arm.

Free movement of the jaws 97 to and from closed positions is assured by lining the opposing inner surfaces of the plates 99 with Teflon or other suitable friction reducing material; and to provide lubrication for the rack and pinion driving connections and the bearings 88, ports 109 lead to the cavities 91 in which the racks are located.

The transfer arms 86 have an L-shaped formation so that the gripper jaws 97, at their outer free ends, are offset from the axis about which the arms swing, and their range of swinging motion is so disposed with respect to a vertical plane containing that axis that at each limit thereof the gripper jaws are horizontally disposed. At one limit of this swinging motion, the gripper jaws face towards the spindle and, at the other limit, they face towards the transfer station TS. When facing the spindle, the gripper jaws 97 are at an elevation slightly below the bottom of the spindle when the latter is in its tool change position, so that upon X axis translation of the transfer mechanism towards the spindle, a tool in the spindle can be grasped by the gripper jaws 97 and then withdrawn from the spindle by downward swinging motion of the transfer arm on which these gripper jaws are mounted. Upon completion of its 180° of swinging motion, the transfer arm brings its gripper jaws 97 to an elevation just below that of the gripper jaws 46 on the tool carriers of the storage magazine. Accordingly, by X axis translation of the transfer mechanism, the tool held by the gripper jaws 97 can be transferred to a carrier of the tool storage magazine that is at the transfer station. By the same token, a tool held by the gripper jaws 46 can be grasped by the gripper jaws 97, provided of course, that the gripper jaws 97 are open and the shuttle bar is at its limit of Y axis motion in which the open jaws are in line with the transfer station.

The concomitant engagement of the tool by the gripper jaws 97 and the gripper jaws 46 — which is needed to effect the transfer — is possible because of the two grooves 22 and 23 in the tool holders, each of which accommodates one of the two pairs of gripper jaws. Another condition essential to transfer of tools between a transfer arm and a magazine carrier is the yielding maintenance of the gripper jaws 46 in their closed position and the positive closure of the transfer arm gripper jaws 97. Because of this, a tool held by the jaws 97 can be pushed into the grasp of the gripper jaws 46 or "plucked" therefrom by X axis translation of the transfer mechanism in the proper direction.

OPERATION

An important feature of the invention is that X axis movement of the carriage towards the spindle to a position somewhat short of the limit of its motion in that direction, locates the transfer arm assembly at a point at which both of its pivoted arms occupy a position closely adjacent to the spindle. This position is known as the "tool-ready" position. In this position, the empty transfer arm, i.e. the arm not having a tool in its grasp, is at that limit of its swinging motion at which its gripper jaws face the spindle and are at a level slightly below the bottom of the spindle, while the other transfer arm — which has the next-to-be-used tool in its grasp — is at the other limit of its swinging motion, with its gripper jaws still facing the transfer station from which that arm had taken the next-to-be-used tool, and with the tool in an inverted upside-down orientation.

By transverse Y axis translation of the transfer arm assembly, brought about either during X axis movement thereof towards the tool-ready position, or directly thereafter, the empty transfer arm is brought into alignment with the spindle axis, so that further X axis motion of the assembly will cause its gripper jaws to embrace the holder of the tool in the spindle, provided that the spindle head is at its tool-transfer elevation in which the circumferential groove 22 of the tool holder, i.e. the one nearest its tapered shank, is at the level of the gripper jaws of the empty transfer arm.

All of the action involved in bringing both transfer arms to the tool-ready position — and which included transporting the tool that had been removed from the spindle by the now empty transfer arm and returning it to its proper tool carrier of the tool storage magazine; the operation of the tool storage conveyor to bring the next-to-be-used tool to the transfer station; transferring that tool to the arm by which it is now held; and imparting the X axis motion to the transfer assembly to bring both transfer arms to the tool-ready position — took place while the spindle was rotating and the tool held thereby was performing a machining operation.

With the transfer arms at the tool ready position, the instant the spindle stops and the spindle head brings the tool holder to the level at which its groove that is nearest the tapered shank of the holder is horizontally aligned with the gripper jaws of the empty transfer arm, the transfer arm assembly can be moved along the X axis towards the spindle the short remaining distance involved in bringing its gripper jaws into embracing relation with the tool holder. This takes but an instant and, as soon as the gripper jaws on the transfer arm have the tool holder in their grasp, the draw bar mechanism of the spindle is actuated to release the tool and provide the clearance between the tapered shank of the tool holder and the spindle socket needed to permit the arcuate swinging motion of the tool to begin. Thereupon, the transfer arm with the tool in its grasp, is swung on its pivot towards the other of its limits of swinging motion 180° away.

Within a few degrees of arcuate motion, the transfer arm carries the tool completely out of the spindle. Hence, well before the transfer arm has traveled through 180° and the tool carried by the arm has been inverted and thus prepared for return to the tool storage magazine, Y axis motion can be imparted to the transfer arm assembly to bring the other transfer arm into alignment with the spindle. Also, even before full alignment is reached, arcuate swinging motion of this other arm can be begun, so that in a minimum of time the new tool is inserted into the spindle and attached thereto. As soon as it is, X axis retraction of the transfer head assembly to disengage the gripper jaws of the transfer arm from the tool just placed in the spindle, can be and is effected.

The necessary positive driving connection between the spindle and the tool held thereby is obtained by the entry of the driving lugs or keys 29 on the spindle into the keyways 27 that are present in every tool holder; and — as has been already explained — the necessary rotational orientation of the tool holders with the spindle is assured by having the lug or key 101 on the transfer arms engage in one of the keyways 28 in the tool holders. The other keyway 28 receives the locking lug or key 59 on the tool carriers 31 of the tool storage magazine, and in so doing secures the tool holders against rotation while the tools are being transferred to and from the magazine and while they are stored in the magazine.

Also, as mentioned before, for the driving connection between the spindle and the tool holder of a tool being inserted into the spindle to be established, it is necessary that the spindle always be stopped in exactly the same position of rotation, and held in that position during the tool change. Moreover, as noted before, by having the spindle always stop in a single position of rotation, single point cutting tools such as preset boring bars, can be lifted from a bored hole without marring its surface and, in addition, such tools will always mate with the spindle in the same manner, to insure highest level accuracy. Stopping the spindle in one identified position of rotation is the responsibility of the control system by which the operation of the machine tool is governed, but which forms no part of this invention.

The functioning of the cylinders 70 and 80 to produce back and forth X axis motion of the carriage and transverse Y axis motion of the shuttle bar, respectively; the delivery of pressure fluid to the cylinders 92 to swing the transfer arms from one position to the other, and to the cylinders 106 to close the gripper jaws 97 of the transfer arms; as well as stopping and starting of the spindle; its rate of rotation; the X and Y axis motions of the work table of the machine tool; the Z axis movement of the spindle head; the operation of the endless tool storage magazine conveyor; and all the other attendant functions of the machine tool and the tool changer, are governed by the control system with which the machine tool is equipped.

TOOL CHANGER SEQUENCE
(FIGS. 17–25)

FIGS. 17–25, inclusive, diagrammatically illustrate the steps involved in effecting a tool change. In these views, the four vertical broken lines A, B, C and D identify the pivot axis of the transfer arms in the four significant positions of the transfer mechanism. "A" identifies the "spindle transfer" position in which the gripper jaws of the transfer arms can embrace a tool in the spindle; "B" identifies the "tool ready" position in which both transfer arms are closely adjacent to the spindle; "C" identifies an "interlock" position which the transfer arms occupy while the magazine conveyor is being indexed and preparatory to having one of the transfer arms moved to the "magazine transfer" position, identified by "D".

In FIG. 17, tool No. 1 is in the spindle, performing its respective operation; the transfer arms are at the tool-ready position B, with the lower one of the arms (designated "L") directly opposite the spindle with its jaws open, and the other arm (designated "U") holding tool No. 2 in inverted upside-down orientation, just as it was when plucked from the magazine carrier No. 2.

Upon completion of the operation performed by tool No. 1, the transfer mechanism begins X axis translation towards the spindle, and indexing of the magazine conveyor to bring its carrier No. 1 to the transfer station takes place. These motions are indicated by the arrows in FIG. 18.

In FIG. 19, X axis translation of the transfer mechanism towards the spindle has been completed and the gripper jaws of the lower transfer arm L have grasped the tool in the spindle; also the magazine carrier No. 1 has arrived at the transfer station TS.

Figure 20:
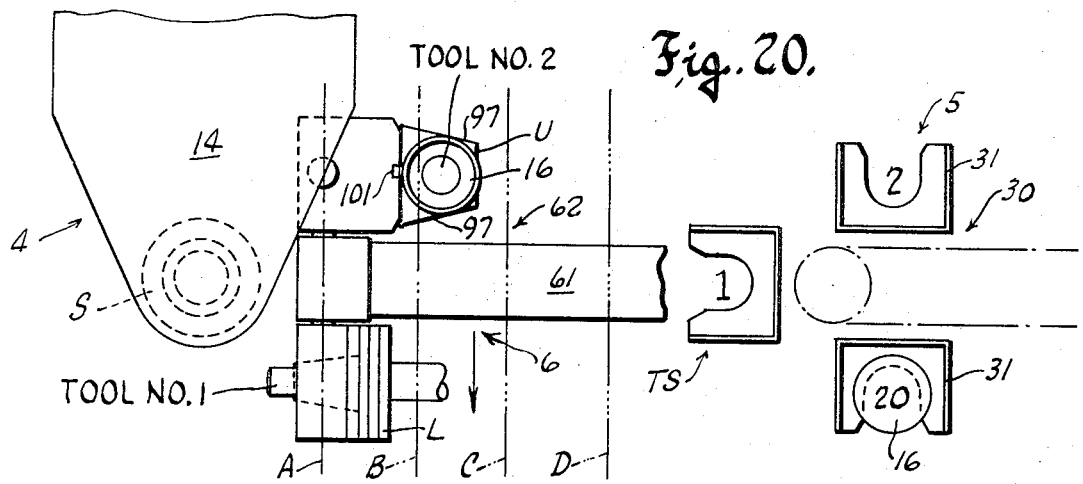
Figure 21:
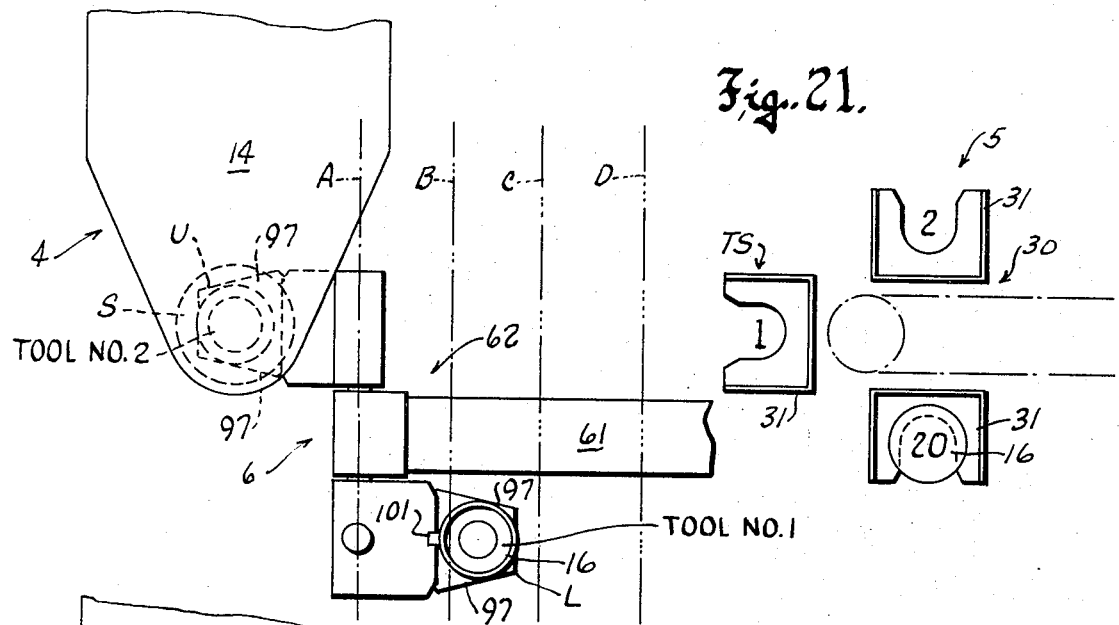

FIG. 20 shows the lower transfer arm L, with tool No. 1 in its grasp, swung 90° from the position it occupied when it grasped tool No. 1, and the shuttle bar moved along the Y axis partway to the position shown in FIG. 21, in which the upper transfer arm U not only is aligned with the spindle but also has been swung 180° to insert tool No. 2 into the spindle. In FIG. 21, the lower transfer arm L holding tool No. 1 has been swung through 180° to invert tool No. 1.

Figure 22:
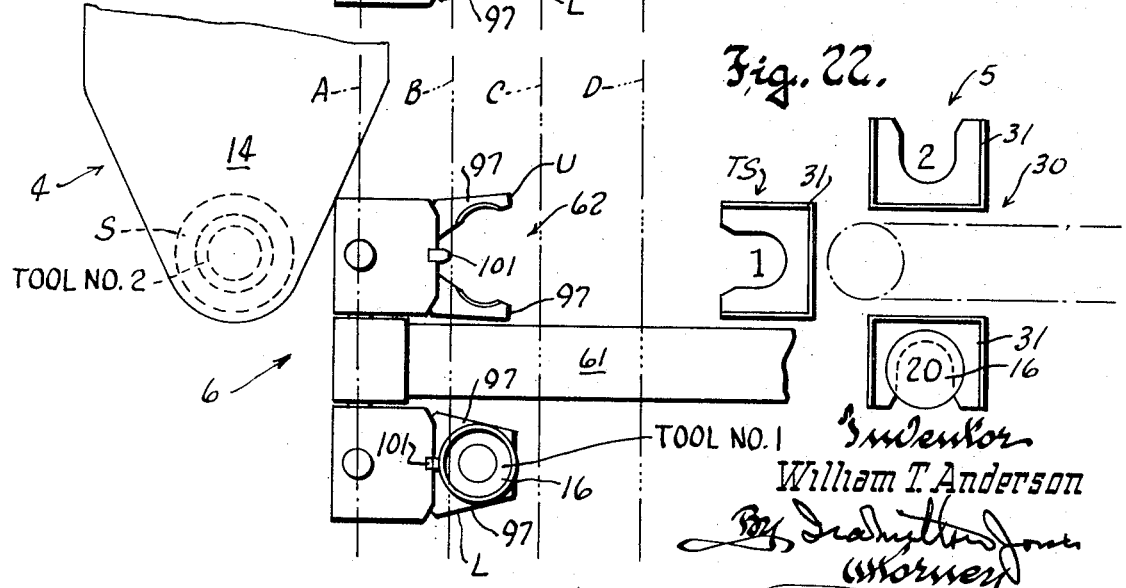

In FIG. 22, the upper — now empty — transfer arm U has been disengaged from tool No. 2 and swung 180° to bring its open jaws to the elevation they must occupy to effect tool transfer at the magazine.

All of the motions depicted in FIGS. 20, 21 and 22 took place with the pivot axis of the transfer arms at the spindle-transfer position A; and, in FIG. 22, tool No. 2 is performing its operation.

As depicted by the northeast pointing arrow in FIG. 23, while tool No. 2 is performing its operation, the transfer mechanism is actuated to move its arms towards positions in which the lower arm L (with tool No. 1 in its grasp) aligns with the magazine carrier No. 1, so that — upon X axis translation towards the magazine — tool No. 1 is returned to its respective magazine carrier. This condition is shown in FIG. 24.

After delivery of tool No. 1 to the magazine (FIG. 24), the transfer mechanism has X axis translation imparted to it to bring it to the intermediate position C, shown in FIG. 25, in which both transfer arms — though facing the magazine transfer station — are far enough away to permit the magazine to be indexed to bring tool No. 3 to the transfer station, as shown in FIG. 26.

With the magazine indexed to bring tool No. 3 to the transfer station (FIG. 26), or during the indexing, Y axis translation is imparted to the shuttle bar to move the transfer arms from the position shown in FIG. 25 to the position they occupy in FIG. 26. Now the upper transfer arm U, with its gripper jaws open, is aligned with the transfer station and tool No. 3 thereat, so that — upon X axis translation of the transfer mechanism towards the magazine — tool No. 3 can be grasped by closing the gripper jaws of upper transfer arm U, as seen in FIG. 27.

The transfer mechanism is now actuated to carry the transfer arms to the tool-ready position, shown in FIG. 28, which is identical with FIG. 17, except with tool No. 3 now positioned close to the spindle which still has tool No. 2 mounted in it and performing its operation.

As indicated by the northwest pointing arrow in FIG. 28, the transfer arms moved along both the X axis and the Y axis in reaching the tool-ready position, either successively or simultaneously. Also, upon reaching the tool-ready position, the lower transfer arm L was swung 180° to prepare the same for translation to the spindle-transfer position in which it will grasp the No. 2 tool in the spindle.

The above described sequence of operations will be repeated as often as necessary to bring all of the tools involved in the performance of a particular job from the magazine to the spindle, and vice versa; and it should be understood that the order in which the tools are transferred from the magazine to the spindle does not necessarily occur in numerical succession, and that whatever tool is called for by the program of operations can be transferred simply by proper indexing of the magazine conveyor. The loading of the tools into the magazine, which is done manually, of course must comport with the programmed sequence fed into the control system.

USE OF THE TRANSFER MECHANISM TO EFFECT MANUAL TRANSFER OF TOOLS (FIGS. 29-34, inclusive)

Although the tool changer of this invention has maximum utility in association with a numerically controlled machine, it can be used to advantage to effect manual transfer of tools to and from the spindle, as depicted in FIGS. 29 through 34. For this purpose, the transfer arms are constrained to Y axis translation and swinging motion about their common pivot axis. In other words, the transfer mechanism is brought to and left in the spindle-transfer location A, identified in FIGS. 17-28.

FIG. 29 illustrates a tool T1 in the spindle and another tool T2 being manually placed in the upper transfer arm U. The spindle has been stopped and the gripper jaws of the lower transfer arm L are open and embracing tool T1 in the spindle. The gripper jaws of the lower transfer arm are now closed to grasp tool T1, as shown in FIG. 30.

With tool No. 1 in the grasp of the lower transfer arm L, that arm swings 180° to withdraw the tool from the spindle and invert it, as shown in FIG. 31.

The transfer mechanism next undergoes Y axis translation to bring its upper arm U into alignment with the spindle, as shown in FIG. 32. Tool T1 can now be manually removed and tool T2 inserted into the spindle by 180° swinging motion imparted to the upper transfer arm, as shown in FIG. 33.

FIG. 34 shows both transfer arms swung away from the spindle which now has tool T2 attached thereto, whereupon a third tool can be manually loaded into the upper one of the tool transfer arms, as depicted in FIG. 29, thereby setting the stage for a repetition of the described sequence.

Those skilled in the art will appreciate that the invention can be embodied in forms other than as herein disclosed for purposes of illustration.

The invention is defined by the following claims.

I claim:

1. Tool transfer apparatus for transferring tools to a machine tool spindle from a magazine that has tool storage sockets selectively movable to a transfer station, and for removing tools from the spindle and returning them to their respective storage sockets, said apparatus comprising:
   A. first and second transfer arms, each of which has tool gripping means;
   B. pivot means mounting said transfer arms for swinging motion about a common axis independently of one another;
   C. carriage means carrying the pivot means and hence the two transfer arms;
   D. means movably mounting the carriage means for linear movement along defined axes at right angles to one another and normal to the spindle axis between the spindle and the magazine and with respect to both; and
   E. controlled power means to impart independent swinging motion to the two transfer arms and to effect linear movement of the carriage means so coordinated with the swinging motion of the transfer arms that
      while the spindle is running and a tool previously placed therein by one of the transfer arms is performing a machining operation,
      1. one of the transfer arms returns a tool it has withdrawn from the spindle to its respective magazine storage socket,
      2. the other transfer arm grasps and removes another tool from its respective magazine storage socket after that storage socket arrives at the transfer station, and 3. both transfer arms are brought to a tool ready position near the spindle from which the empty first transfer arm is quickly movable into tool grasping relationship with the tool in the spindle when the spindle stops, so that by pivotal motion of that transfer arm in one direction, the grasped tool is withdrawn from the spindle, enabling the second transfer arm to replace the withdrawn tool with the tool in its grasp.

2. A tool changer for a machine tool having a spindle to which any one of a number of tools may be detachably coupled, and a tool storage magazine having spaced sockets to hold said tools, the tool storage magazine being movable to bring any selected one of its sockets to a transfer station, said tool changer comprising:

A. a pair of transfer arms each having a mounted end and a free end with tool gripping means at the free end;

B. movable supporting structure for the transfer arms;

C. pivot means connecting the mounted ends of the transfer arms with the movable supporting structure whereby the transfer arms can independently swing with respect to one another and with respect to the supporting structure about the axes of the pivot means;

D. means mounting the supporting structure for movement in either direction along a first axis extending generally from the tool changer to the spindle, and for movement in either direction along a second axis transverse to the first.

so that by controlled movement of the supporting structure along said two axes, the pivot means of the two transfer arms can be brought to either of two locations at one of which swinging motion of one of the two transfer arms about the axis of its respective pivot means carries the tool gripping means of that arm along an arcuate path that lies in a plane coincident with the axis of the spindle, and in the other of which swinging motion of the other transfer arm carries its tool gripping means along an arcuate path that also lies in a plane coincident with the spindle; and E. means for imparting such movement to the supporting structure and for imparting swinging movement to the transfer arms.

3. A tool changer for a machine tool having a spindle to which any one of a number of tools may be detachably coupled, and having a tool storage magazine for said tools, said tool changer comprising:

A. a transfer arm having a mounted end and a free end with tool gripping means at its free end;

B. mounting means for said transfer arm connected with its mounted end and mounting the arm between the spindle and the tool storage magazine, said mounting means being physically isolated from the machine tool served by the tool changer and providing for 1. swinging of the arm about its mounted end with the arm constrained to travel in a single plane perpendicular to the axis about which it swings, and 2. bodily travel of the arm with respect to both the spindle and the tool storage magazine along a linear path that extends between a first location adjacent to the tool storage magazine and a second location adjacent to the spindle, in the first of which locations the tool gripping means on the free end of the arm is cooperatively related to the tool storage magazine to enable transfer of a tool from one to the other, and in the second of which locations the axis about which the arm swings is spaced a distance from the spindle such that the arm-carried tool gripping means travels in an arc so related to the spindle axis that a tool in the grasp of said gripping means can be operatively coupled to the spindle upon swinging of its arm towards the spindle, and also a tool on the spindle and grasped by said tool gripping means can be uncoupled from the spindle upon swinging of said arm away from the spindle; and C. actuating means for the transfer arm operable to 1. swing the arm about its mounted end, and
2. move the arm linearly from one to the other of said two locations.

4. The tool changer of claim 3, wherein the axis about which the transfer arm swings is perpendicular with the spindle axis.

5. The tool changer of claim 3, wherein the axis about which the transfer arm swings is normal to the spindle axis, and in the second location to which the transfer arm is movable is so spaced from the spindle that the centerline of a tool in the grasp of the gripper means travels in an arc that lies in said single plane and is tangent to the spindle axis.

6. The tool changer of claim 5, wherein the swinging movement of the transfer arm has defined limits 180° apart, and which limits are so located relative to the spindle that at each of said limits the centerline of a tool in the grasp of the gripper means is parallel with the spindle axis, so that the tool is inverted as it is carried to and from the spindle.

7. The tool changer of claim 6, wherein the spindle axis is vertical, wherein the bodily travel of the transfer arm between its first and second locations is horizontal, wherein the axis about which the transfer arm swings is at an elevation above the bottom of the spindle, and wherein the transfer arm is of such shape and size that when it is at its limit of swinging motion at which its gripper means is adjacent to the spindle, said gripper means is horizontally disposed at a level below that of the axis about which the transfer arm swings and directly below the spindle, and when the transfer arm is at its other limit of swinging motion its gripper means is at an elevation above that of said axis.

8. A tool changer for a machine tool having a spindle to which any one of a number of tools may be detachably coupled, and a tool storage magazine for said tools, said tool changer comprising:

A. a pair of transfer arms, each having a mounted end and a free end with tool gripper means at its free end;

B. mounting means for said transfer arms connected with the mounted ends thereof and mounting the arms between the spindle and the tool storage magazine, said mounting means providing for 1. swinging of the arms independently of one another about a common axis at the mounted ends thereof and normal to the spindle axis,
2. translation of the arms along said common axis to enable the gripper means of one or the other of the arms to swing in a plane containing the spindle axis, and
3. travel of the arms between a first location adjacent to the tool storage magazine and a second location adjacent to the spindle,
   in the first of which locations the gripper means of one of the arms is cooperatively related to the tool storage magazine to enable transfer of a tool from one to the other, and in the second of which locations the common axis about which the arms swing is so spaced from the spindle axis that the centerline of a tool in the grasp of the arm-carried gripper means that swings in a plane containing the spindle axis travels in an arc tangent to the spindle axis so that the tool in the grasp of said gripper means can be operatively coupled to the spindle upon swinging of its arm towards the spindle and a tool held by the spindle can be grasped by said gripper means and uncoupled from the spindle upon swinging of said arm away from the spindle; and C. actuating means for the transfer arms operable to 1. swing the arms independently of one another about said common axis,
2. effect translation of the arms along said common axis, and
3. move the arms from one to the other of said two locations.

9. A tool changer according to claim 3, further characterized in that the tool storage magazine has a plurality of tool gripping means, all of which carry the tools placed therein in inverted disposition with respect to the disposition of the tools when in the spindle of the machine tool; and wherein the swinging movement of the transfer arm with a tool taken from the tool storage means in the grasp of its tool gripping means turns the tool end over end as it couples the tool to the spindle.

10. A tool changer according to claim 3, further characterized in that there are two transfer arms pivotally carried by the mounting means to swing in planes that are spaced apart and parallel with the spindle axis, so that only one at a time of said two transfer arms can occupy said second position;
and still further characterized in that the mounting means for the transfer arms also provides for bodily movement together of both transfer arms transversely to said linear path, so that each of said transfer arms can be brought to said second position.

11. A tool changer according to claim 10, further characterized in that said two transfer arms are mounted to be swung independently of one another about a common axis.

12. A tool changer according to claim 10, wherein the tools carried by the tool storage magazine are detachably held in tool storage sockets selectively movable to a transfer station, wherein said mounting means for the transfer arms comprises:

A. carriage means mounted to move along said linear path;
B. pivot means to which the mounted ends of the transfer arms are connected;
C. means mounting said pivot means on the carriage means for movement of the pivot means at right angles to said linear path, to thereby provide for said bodily movement of the transfer arms transversely to said linear path; and
D. controlled power means to impart independent swinging motion to the two transfer arms and to effect movement of the carriage means and said pivot means so coordinated with the swinging motion of the transfer arms that while the spindle is running and a tool previously placed therein by one of the transfer arms is performing a machining operation, 1. one of the transfer arms returns a tool it has withdrawn from the spindle to its respective magazine storage socket,
2. the other transfer arm grasps and removes another tool from its respective magazine storage socket after that storage socket arrives at the transfer station, and
3. both transfer arms move to a tool ready position near the spindle from which the empty first transfer arm is movable to effect withdrawal of the tool in the spindle when the spindle stops, and the second transfer arm is movable to replace the withdrawn tool with the tool in its grasp.

13. A tool changer according to claim 10, wherein the tool storage magazine has spaced tool storage sockets in which the tools are detachably carried and the tool storage magazine is movable to bring any selected one of its sockets to a transfer station, and wherein the mounting means for the transfer arms comprises:

A. movable supporting structure;
B. pivot means independently connecting the mounted ends of the transfer arms with the movable supporting structure whereby the transfer arms can swing independently of one another and with respect to the supporting structure about the axes of the pivot means;
C. means mounting the supporting structure for movement in either direction along a first axis extending generally from the tool storage magazine to the spindle, to provide for movement of the transfer arms along said linear path and for movement in either direction along a second axis transverse to the first to provide for bodily movement of the transfer arms transversely to said linear path,
   so that by controlled movement of the supporting structure along said two axes, the pivot means of the two transfer arms can be brought to either of two locations at one of which swinging motion of one of the two transfer arms about the axis of its respective pivot means brings the tool gripping means of that arm into alignment with the spindle for either delivery of a tool to the spindle or removal of a tool therefrom, and in the other of which swinging motion of the other transfer arm brings its tool gripping means into alignment with the spindle; and
D. means for imparting swinging movement to the transfer arms.

14. A tool changer according to claim 9, wherein the tool storage magazine comprises:

A. an endless conveyor constrained to travel in a horizontally disposed orbit and having tool carriers thereon, each of said carriers having a horizontally disposed bifurcated arm projecting outwardly of the orbit of the conveyor;
B. a pair of complementary tool gripping jaws pivotally mounted on the bifurcated arm for movement in a common horizontal plane towards and from tool gripping positions symmetrically disposed with respect to the bifurcation of said arm; and
C. spring means yieldingly urging said jaws to their tool gripping positions, in which positions the jaws embrace and retain the holder of a tool inserted into the bifurcation of said horizontal arm.

15. A tool changer according to claim 9, wherein the carriers of the tool storage magazine are movable around a defined horizontally disposed orbit to and from a transfer station at which tools may be taken from the magazine and returned thereto with their axes vertical, said tool storage magazine being further characterized by:
  a pair of complementary jaws pivotally mounted on each tool carrier to swing in a common horizontal plane to and from an operative position in which the jaws embrace and releasably hold the holder of a tool placed therebetween with its axis vertical, said jaws being of a size and shape to snugly fit into one of the circumferential grooves in the tool holders,
  and spring means yieldingly urging the jaws towards their operative position.

16. Tool changer apparatus for exchanging tools between a spindle of a machine tool and tool storage means, comprising:
A. two transfer arms each being provided with tool gripping means;
B. mounting means for said transfer arms, said mounting means being physically isolated from the machine tool served by the tool changer but having a fixed orientation thereto,
  said mounting means including
  1. carriage means,
  2. pivot means connecting said transfer arms with the carriage means for simple rotary motion with respect thereto and independently of one another about axes that are normal to the spindle axis and that constrain said rotary motion to spaced apart planes parallel to the spindle axis, and
  3. means mounting the carriage means for linear movement along defined paths at right angles to one another and normal to the spindle axis, to enable the carriage means to be brought to and from a first position at which the transfer arms can remove tools from the tool storage means and return tools to the tool storage means and to and from a second position at which said rotary motion in one direction of a transfer arm carrying a tool can insert that tool into the spindle and said rotary motion in the opposite direction of a transfer arm that has gripped a tool in the spindle can remove that tool from the spindle; and
C. power means operatively connected with said carriage means and with said transfer arms for effecting the aforesaid tool transferring operations.

17. The tool changer apparatus of claim 16, wherein the axes of said pivot means by which the transfer arms are connected with the carriage means coincide,
  so that said rotary motion of both transfer arms is about a common axis.

18. Tool changer apparatus for exchanging tools between a spindle of a machine tool and tool storage means, comprising:
A. two transfer arms each being provided with tool gripping means;
B. mounting means for the two transfer arms, said mounting means being physically isolated from the machine tool served by the tool changer but having a fixed orientation thereto, said mounting means mounting the transfer arms for
  1. simple rotary motion independently of one another about axes that are normal to the axis of the machine tool spindle and that constrain the rotary motion of the transfer arms to spaced parallel planes that are at all times parallel to the spindle axis, and
  2. bodily linear movement together and with respect to the machine tool spindle along defined paths that are at right angles to one another and so located with respect to the spindle that without interference from the spindle or a tool held thereby, and while the spindle-held tool is performing a machining operation, one transfer arm can return a tool which has just been removed from the spindle to the tool storage means and the other transfer arm can remove another tool from the tool sotrage means and move it along one of said defined paths towards the spindle to a position from which movement along the other of said defined paths for a short distance places the plane to which rotary motion of said other transfer arm is constrained in line with the spindle axis; and
C. power means for imparting the aforesaid motions and movement to the two transfer arms.

19. A tool changer for transferring tools between a vertical machine tool spindle and a tool storage magazine, characterized by:
A. a transfer arm having a mounted end and a free end with tool gripping means at its free end;
B. pivot means to which the mounted end of the transfer arm is connected for simple rotary motion of the transfer arm in a plane normal to the axis about which said rotary motion occurs;
C. means mounting said pivot means for linear horizontal movement towards and from the machine tool spindle with the plane to which said rotary motion of the transfer arm is constrained vertical and hence parallel with the axis of the machine tool spindle and positionable in alignment with said spindle axis, so that with the pivot means at a predetermined distance from the machine tool spindle, rotary motion of the transfer arm in one direction can couple a tool held by its tool gripping means to the spindle, and rotary motion of the transfer arm in the other direction can remove from the spindle a tool in the grasp of its tool gripping means; and
D. power means to impart said linear horizontal movement to the pivot means and rotary motion to the transfer arm.

* * * * *